(12) United States Patent
Holtcamp et al.

(10) Patent No.: US 9,321,914 B2
(45) Date of Patent: Apr. 26, 2016

(54) PROPYLENE COPOLYMER COMPOSITIONS AND PROCESSES TO PRODUCE THEM

(71) Applicant: ExxonMobil Chemical Patents Inc., Baytown, TX (US)

(72) Inventors: Matthew W. Holtcamp, Huffman, TX (US); Prasadarao Meka, Seabrook, TX (US); Celestino M. Perez, Jr., Pasadena, TX (US); Gregory S. Day, Pasadena, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/051,571

(22) Filed: Oct. 11, 2013

(65) Prior Publication Data
US 2014/0121325 A1    May 1, 2014

Related U.S. Application Data
(60) Provisional application No. 61/720,560, filed on Oct. 31, 2012.

(51) Int. Cl.
| | |
|---|---|
| C08L 23/00 | (2006.01) |
| C08L 23/14 | (2006.01) |
| C08F 210/06 | (2006.01) |
| C08F 4/659 | (2006.01) |
| C08F 4/6592 | (2006.01) |

(52) U.S. Cl.
CPC .............. *C08L 23/14* (2013.01); *C08F 210/06* (2013.01); *C08F 4/65908* (2013.01); *C08F 4/65912* (2013.01); *C08F 4/65916* (2013.01); *C08F 4/65927* (2013.01)

(58) Field of Classification Search
CPC ....................................................... C08L 23/26
USPC ................................................. 525/195, 240
See application file for complete search history.

(56) References Cited

U.S. PATENT DOCUMENTS

| | | | |
|---|---|---|---|
| 4,547,552 A * | 10/1985 | Toyota et al. ................. | 525/247 |
| 4,892,851 A | 1/1990 | Ewen et al. | |
| 5,166,268 A | 11/1992 | Ficker | |
| 5,250,631 A | 10/1993 | Mccullough, Jr. et al. | |
| 5,258,464 A | 11/1993 | Mccullough, Jr. et al. | |
| 5,416,228 A | 5/1995 | Ewen et al. | |
| 5,948,839 A | 9/1999 | Chatterjee | |
| 5,990,242 A | 11/1999 | Naga et al. | |
| 6,319,998 B1 * | 11/2001 | Cozewith et al. ................ | 526/65 |
| 6,492,465 B1 | 12/2002 | Burkhardt et al. | |
| 6,627,706 B1 | 9/2003 | Follestad et al. | |
| 7,053,153 B2 | 5/2006 | Schauder | |
| 7,122,498 B2 | 10/2006 | Hart et al. | |
| 7,521,507 B2 | 4/2009 | Lewtas et al. | |
| 7,816,452 B2 | 10/2010 | Dahn et al. | |
| 2007/0203299 A1 | 8/2007 | Mavridis et al. | |

FOREIGN PATENT DOCUMENTS

| | | |
|---|---|---|
| EP | 0 423 101 | 4/1991 |
| EP | 0 426 646 | 5/1991 |
| EP | 1 847 551 | 10/2007 |
| EP | 1 900 764 | 3/2008 |
| EP | 1 939 230 | 7/2008 |
| WO | 01/48034 | 7/2001 |
| WO | 2004/101673 | 11/2004 |
| WO | 2005/058916 | 6/2005 |
| WO | 2006/100258 | 9/2006 |
| WO | 2012/080294 | 6/2012 |

\* cited by examiner

*Primary Examiner* — Nathan M Nutter
(74) *Attorney, Agent, or Firm* — Kevin M. Faulkner; Renuka Ganesh

(57) ABSTRACT

This invention relates to a process for producing propylene-based in-reactor compositions comprising: (a) contacting propylene and from about 0 wt % to 10 wt % $C_2$ and/or $C_4$ to $C_{20}$ alpha olefins under polymerization conditions in a first stage to form Component A; (b) contacting Component A, ethylene and from about 3 wt % to 30 wt % of one or more $C_3$ to $C_{20}$ alpha olefin, in the presence of a metallocene catalyst system, under polymerization conditions in a second stage to form Component B; wherein the metallocene catalyst system comprises: (i) a metallocene compound comprising a group 4, 5, or 6 metal, (ii) an activator, and (iii) a support material; and (c) obtaining a propylene-based in-reactor composition comprising Component A and Component B, wherein the propylene-based in-reactor composition has a multimodal melting point. Propylene-based in-reactor compositions and articles comprising these propylene compositions are also disclosed.

20 Claims, 1 Drawing Sheet

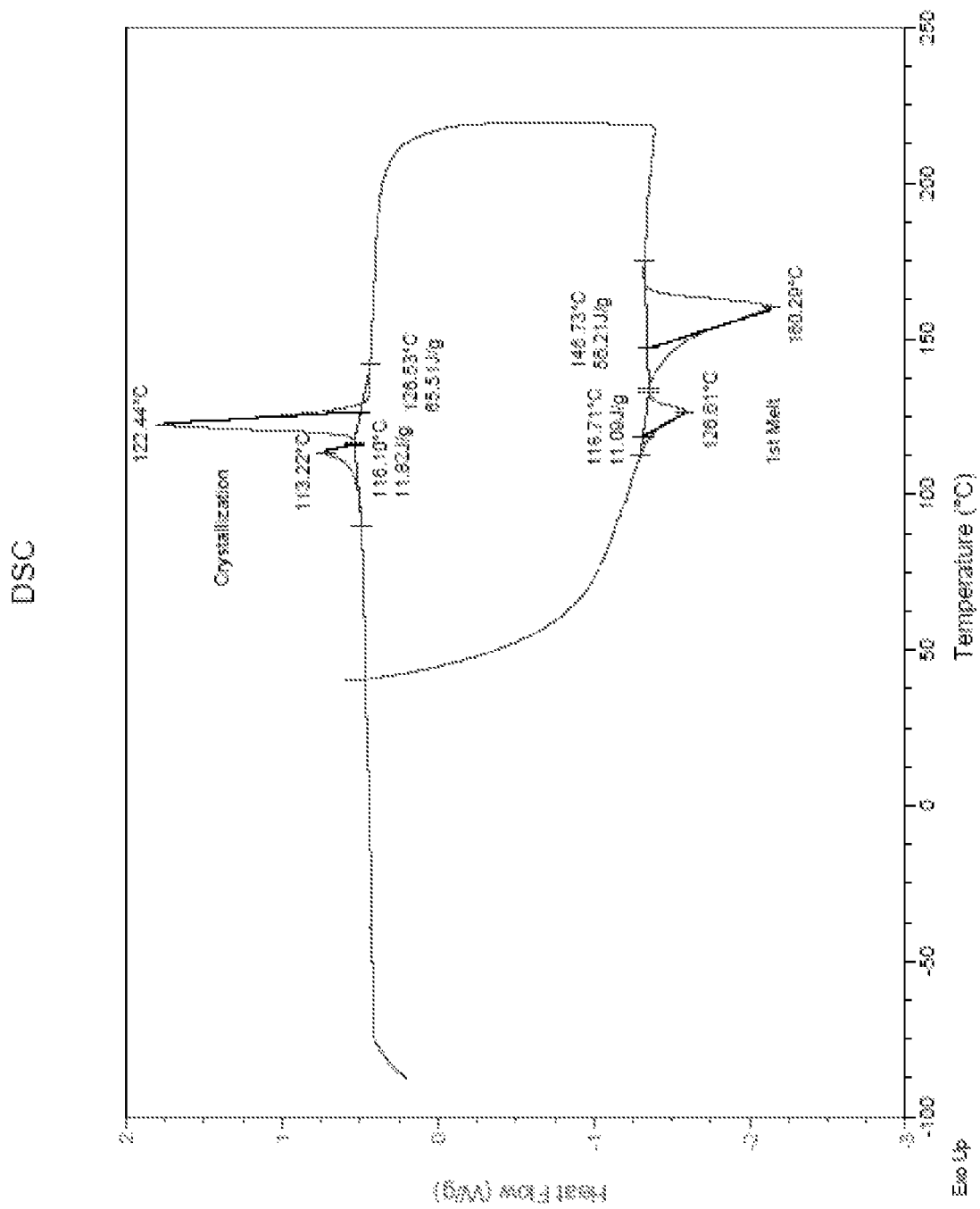

PROPYLENE COPOLYMER COMPOSITIONS AND PROCESSES TO PRODUCE THEM

CROSS-REFERENCE OF RELATED APPLICATION

This application claims priority to and the benefit of U.S. Provisional Application No. 61/720,560, filed Oct. 31, 2012, the disclosure of which is incorporated herein by reference in its entirety. This application is related to U.S. Provisional Application No. 61/720,555, filed Oct. 31, 2012.

FIELD OF THE INVENTION

This application relates to propylene copolymer compositions and processes to produce them. In particular, these propylene copolymer compositions may be produced on a commercial scale using metallocene catalysts.

BACKGROUND OF THE INVENTION

Propylene impact copolymers are commonly used in a variety of applications where strength and impact resistance are desired, such as molded and extruded automobile parts, household appliances, luggage and furniture. Propylene homopolymers are often unsuitable for such applications because they tend to be brittle and have low impact resistance particularly at low temperature, whereas propylene impact copolymers are specifically engineered for applications such as these.

A typical propylene impact copolymer contains two phases or components, a polypropylene (typically homopolypropylene) component and a propylene copolymer component. These two components are usually produced in a sequential polymerization process wherein the polypropylene produced in a first reactor is transferred to a second reactor where copolymer is produced and incorporated within the matrix of the homopolymer component. The copolymer component typically has rubbery characteristics and provides the desired impact resistance, whereas the polypropylene component provides overall stiffness.

Propylene impact copolymers are traditionally made using Zeigler Natta catalyst systems. Many process variables influence the resulting impact copolymer and these have been extensively studied and manipulated to obtain various desired effects. Examples of these may be found in U.S. Pat. No. 5,166,268 (describing a "cold forming" process); U.S. Pat. No. 5,258,464 (describing propylene impact copolymers with improved resistance to "stress whitening") and U.S. Pat. No. 5,250,631 (describing a propylene impact copolymer having a homopolypropylene first component and an ethylene/butene/propylene terpolymer second component).

The composition of the first and second component may also influence the resulting impact copolymer, and any applications using that polymer. For example, U.S. Pat. No. 5,948,839 describes a conventional first component and 25 to 45 weight percent ethylene/propylene second component having from 55 to 65 weight percent ethylene. This impact copolymer composition has a melt flow of from 7 to 60 dg/min, and may be used to produce films useful in articles such as diapers.

U.S. Pat. No. 7,816,452 describes a process for preparing propylene polymer compositions in at least a two stage process, wherein in a first stage propylene homopolymer or a propylene copolymer, containing at least 85% by weight of propylene is prepared and in a second stage ethylene and at least one comonomer selected from propylene and $C_4$ to $C_{10}$ 1-alkenes are polymerized to give an ethylene polymer comprises about 90% by weight of ethylene, and wherein the amount of ethylene polymer in the propylene polymer composition ranges from 10% to 50% by weight and the propylene polymer composition has an MFR (ISO 1133 at 230° C., 2.16 kg) of from 2 to 50 g/10 min. The propylene polymer compositions may be particularly useful for the production of molding, especially by injection or blow molding.

Recently, efforts have been made to prepare propylene impact copolymers using the metallocene catalysis technology in order to capitalize on the inherent benefits such catalysts are known to provide. Metallocene catalyzed homopolymers typically have narrow molecular weight distributions, and low extractables and a variety of other favorable properties associated therewith. Metallocene catalyzed copolymers typically have narrow composition distributions in addition to narrow molecular weight distribution and low extractables. Unfortunately, most known metallocenes are not able to provide copolymer components with high enough molecular weight under commercially relevant process conditions. The resulting propylene impact copolymers therefore tend to have poor impact strength compared to their conventionally catalyzed counterparts.

U.S. Pat. No. 5,990,242 approaches this problem by using an ethylene/butene (or higher α-olefin) copolymer second component, rather than a propylene copolymer, prepared using a hafnocene type metallocene. Such hafnium metallocenes in general are known for producing relatively higher molecular weight polymers, however, their activities are much lower than the more commonly used zirconocenes. In any event, the second component molecular weights and intrinsic viscosities are lower than desired for good impact strength. U.S. Pat. No. 6,492,465 also describes the use of metallocene catalysts to provide propylene impact copolymers.

The present inventors have discovered new propylene compositions having the benefits of metallocene catalyzed polymers in addition to properties needed for high impact strength. Importantly, these polymers can be economically produced using commercial-scale processes.

SUMMARY OF THE INVENTION

This invention relates to a process for producing propylene-based in-reactor compositions comprising: (a) contacting propylene and from about 0 wt % to 10 wt % $C_2$ and/or $C_4$ to $C_{20}$ alpha olefins under polymerization conditions in a first stage to form Component A; (b) contacting Component A, ethylene and from about 3 wt % to 30 wt % of one or more $C_3$ to $C_{20}$ alpha olefin, in the presence of a metallocene catalyst system, under polymerization conditions in a second stage to form Component B; wherein the metallocene catalyst system comprises: (i) a metallocene compound comprising a group 4, 5, or 6 metal, (ii) an activator, and (iii) a support material; and (c) obtaining a propylene-based in-reactor composition comprising Component A and Component B, wherein the propylene-based in-reactor composition has a multimodal melting point, optionally, an elongation at break of greater than 100%.

This invention also relates to a propylene-based in-reactor composition comprising: (a) from about 50 wt % to 90 wt % of a Component A polymer, based on the weight of the in-reactor composition; wherein Component A comprises 90 wt % to 100 wt % propylene derived units and 0 wt % to 10 wt % $C_2$ and/or $C_4$ to $C_{20}$ alpha olefin derived units, based on the weight of Component A; and (b) from about 10 wt % to about 50 wt % of a Component B copolymer, based on the weight of the in-reactor composition; wherein Component B comprises 70 wt % to 97 wt % ethylene derived units and 3 wt % to 30 wt % $C_3$ to $C_{20}$ alpha olefin derived units, based on the weight of Component B; wherein the total ethylene content of the propylene-based in-reactor composition ranges from 7.5 wt % to 48.5 wt %; and wherein the propylene-based in-reactor composition has a multimodal melting point; and wherein the propylene-based in-reactor composition has an elongation at break of greater than 100%.

BRIEF DESCRIPTION OF THE DRAWINGS

FIG. 1 is a representation of a DSC (Differential Scanning Chromatography) trace of Inventive Example 1 showing a multimodal melting point (first melt).

DETAILED DESCRIPTION OF THE INVENTION

In-reactor propylene copolymers used as impact copolymers are typically produced using Zeigler-Natta catalysts, and usually comprise a homopolypropylene component and a propylene copolymer component. Generally, the polypropylene resin particles are formed first, and then these polypropylene resin particles are subjected to a mix of propylene and a comonomer, typically ethylene, to form ethylene-propylene rubber (EPR) in the pores of the polypropylene resin. Some work has been done to make impact copolymers with metallocenes, however, there have been difficulties in increasing the amount of ethylene within the ICP, using the conventional catalysts and polymerization processes. Accordingly, the EPR component of metallocene catalyzed impact copolymers usually has low amounts of polyethylene, typically around 15 wt % or less.

The inventors have surprisingly discovered new propylene-based compositions having unusually high elongation at break. These propylene compositions are in-reactor compositions, meaning that the compositions are made in a single reaction zone or in a series of reaction zones, and are therefore distinct from physical blends. Furthermore, these in-reactor compositions are metallocene catalyzed and have higher amounts of polyethylene in the second phase, thereby producing a crystalline ethylene polymer. These in-reactor compositions therefore comprise a crystalline Component A and a crystalline Component B. Accordingly, a multimodal melting point (Differential Scanning calorimetry (DSC)), first melt is observed. The inventors have surprisingly discovered that these propylene-based compositions exhibit unusually high elongation at break, indeed much higher than conventional ICPs. Advantageously, these propylene-based compositions exhibit improved elongation at break without detriment to other physical properties.

DEFINITIONS

For the purposes of this invention and the claims thereto, the new numbering scheme for the Periodic Table Groups is used as set out in CHEMICAL AND ENGINEERING NEWS, 63(5), pg. 27 (1985). Therefore, a "group 4 metal" is an element from group 4 of the Periodic Table.

An "olefin," alternatively referred to as "alkene," is a linear, branched, or cyclic compound of carbon and hydrogen having at least one double bond. For the purposes of this invention and the claims thereto, when a polymer is referred to as "comprising an olefin," the olefin present in the polymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different," as used to refer to mer units, indicates that the mer units differ from each other by at least one atom or are different isomerically. Accordingly, the definition of copolymer, as used herein, includes terpolymers and the like.

An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For the purposes of this invention and the claims thereto, ethylene shall be considered an α-olefin.

For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the metallocene compound may be described as a catalyst precursor, a pre-catalyst compound, a catalyst compound, a metallocene catalyst compound or a transition metal compound, and these terms are used interchangeably.

A polymerization catalyst system is a catalyst system that can polymerize monomers to polymer and comprises a catalyst compound, an activator and an optional support.

A metallocene compound is defined as an organometallic compound with at least one π-bound cyclopentadienyl moiety (or substituted cyclopentadienyl moiety) and more frequently two π-bound cyclopentadienyl moieties or substituted cyclopentadienyl moieties.

For purposes of this invention and claims thereto, in relation to metallocene compounds, the term "substituted" means that a hydrogen group has been replaced with a hydrocarbyl group, a heteroatom, or a heteroatom containing group. For example, methyl cyclopentadiene (Cp) is a Cp group substituted with a methyl group. Accordingly, indene and fluorene are considered substituted cyclopentadienyl moieties.

Otherwise, the term "substituted" means that a hydrogen group has been replaced with a heteroatom, or a heteroatom containing group. For example, a "substituted hydrocarbyl" is a radical made of carbon and hydrogen where at least one hydrogen is replaced by a heteroatom or heteroatom containing group.

For purposes of this invention and claims thereto, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gpolymer/g(cat)/hr. "Catalyst activity" is a measure of how many grams of polymer are produced using a polymerization catalyst comprising W g of catalyst (cat) and may be expressed by the following formula: P/W and expressed in units of gP/g(cat), and is typically used for batch processes. Catalyst activity may be converted to catalyst productivity by taking into account the run time of the batch process: catalyst productivity=catalyst activity/T, where T is the run time in hours.

As used herein, Mn is number average molecular weight, Mw is weight average molecular weight, and Mz is z average molecular weight, wt % is weight percent, and mole % is mole percent. Molecular weight distribution (MWD), also referred to as polydispersity, is defined to be Mw divided by Mn. Unless otherwise noted, all molecular weight units (e.g., Mw, Mn, Mz) are g/mol.

The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, and MAO is methylalumoxane.

Propylene-Based Compositions

This invention relates to a propylene-based in-reactor composition comprising: (a) from about 50 wt % to 90 wt % of a Component A polymer, based on the weight of the in-reactor composition; wherein Component A comprises 90 wt % to 100 wt % propylene derived units and 0 wt % to 10 wt % $C_2$ and/or $C_4$ to $C_{20}$ alpha olefin derived units, based on the weight of Component A; and (b) from about 10 wt % to about 50 wt % of a Component B copolymer, based on the weight of the in-reactor composition; wherein Component B comprises 70 wt % to 97 wt % ethylene derived units and 3 wt % to 30 wt % $C_3$ to $C_{20}$ alpha olefin derived units, based on the weight of Component B; wherein the total ethylene content of the propylene-based in-reactor composition ranges from 7.5 wt % to 48.5 wt %; and wherein the propylene-based in-reactor composition has a multimodal melting point; and wherein the propylene-based in-reactor composition has an elongation at break of greater than 100%.

This invention relates to propylene-based in-reactor compositions. "Propylene-based composition" means composition comprising at least 50% propylene mer units (mol %).

As used herein the term "in-reactor composition" is intended to mean a mixture of polymers produced in a plurality of polymerization stages without the need for post polymerization blending (although the resultant copolymer can undergo post polymerization blending, for example, to incorporate modifiers, additives, or additional blend components). Each polymer component in the mixture possesses a unique molecular structure such as percent comonomer content, composition distribution, molecular weight, molecular weight distribution, and molecular architecture such as tacticity or branched block structure. Although the various polymerization stages will normally be conducted in different polymerization zones, that is in different reactors or different parts of the same reactor, the stages could be conducted sequentially in the same polymerization zone.

A polymerization zone is defined as an area where activated catalysts and monomers are contacted and a polymerization reaction takes place. When multiple reactors are used in either series or parallel configuration, each reactor is considered as a separate polymerization zone. For a multistage polymerization in both a batch reactor and a continuous reactor, each polymerization stage is considered as a separate polymerization zone.

The propylene-based in-reactor compositions of the present invention comprise a Component A and a Component B, typically from about 50% to about 90% by weight Component A and from about 10% to about 50% by weight Component B, preferably from about 60% to about 90% by weight Component A and from about 10% to about 40% Component B, even more preferably from about 70% to about 85% by weight Component A and from about 15% to about 30% by weight Component B. In the most preferred embodiment, the propylene-based in-reactor composition consists essentially of Components A and B.

The propylene-based in-reactor composition may be separated using preparative TREF (Temperature Rising Elution Fractionation) into Components A and B. This procedure employs a sequential TREF separation. Approximately 1 gram of resin is dissolved in 100 ml of xylene, stabilized with 600 ppm of butylated hydroxy toluene (BHT), at 130° C. for one hour. The solution is crystallized by slowly cooling it down to 30° C. or to subambient temperatures using a cooling rate of 0.2° C. The cooled sample is heated at its lowest temperature (30° C. or to subambient temperatures) for 45 minutes and then the first fraction (the most amorphous) is collected into an external bottle, the rest of the polymer remains in the vessel as it has been retained by the filter. Subsequent fractions are obtained by increasing the temperature stepwise, by about 3° C. per step, to within a specified temperature range (such as a peak temperature), heated within that specified temperature range for 45 minutes and repeating the same isolation procedure as for the first fraction. Once all the fractions are isolated in the external bottles, the polymer is precipitated by adding acetone and cooling the bottles. Then the mixture is filtered using an external filtration system and recovering the physical fractionated polymer component. As used herein Component A refers generally to the xylene insoluble portion of the in-reactor composition, and Component B refers generally to the xylene soluble portion of the in-reactor composition.

The propylene-based in-reactor compositions of this invention are characterized as having low amorphous polypropylene content, preferably less than 3% by weight (based upon the weight of the propylene-based in-reactor composition), more preferably less than 2% by weight, even more preferably less than 1% by weight and most preferably there is no measurable amorphous polypropylene.

The overall comonomer (preferably ethylene) content of the propylene-based in-reactor composition is preferably in the range of from about 7.5% to about 48.5% by weight, preferably from about 8% to about 45% by weight, even more preferably from about 10% to about 40% by weight, still more preferably from about 10% to about 35% by weight. Ethylene (or other comonomer) content of the composition may be determined using ASTM D-3900.

Component A

Component A preferably comprises 90 wt % to 100 wt % propylene derived units and 0 wt % to 10 wt % $C_2$ and/or $C_4$ to $C_{20}$ alpha olefin derived units, based on the weight of Component A. Component A is preferably an isotactic propylene homopolymer (preferably comprising 0 wt % $C_2$ and/or $C_4$ to $C_{20}$ alpha olefin derived units). In some embodiments, small amounts of a comonomer may be used to obtain particular properties. In such embodiments, Component A comprises from about 0.5% to 10% by weight, preferably from about 1% to 6% by weight or less of $C_2$ and/or $C_4$ to $C_{20}$ alpha olefin derived units (preferably comonomers such as ethylene, butene, hexene, or octene, most preferably, less than 4% by weight ethylene is used). The end result is usually a copolymer Component A having lower stiffness but with some gain in impact strength compared to a homopolymer Component A.

Component A preferably has a narrow molecular weight distribution (Mw/Mn or "MWD"), preferably 3.5 or less, preferably 3.0 or less, preferably 2.5 or less, and preferably 2.25 or less. These molecular weight distributions are obtained in the absence of visbreaking using peroxide or other post reactor treatment designed to reduce molecular weight. Component A preferably has a weight average molecular weight (Mw as determined by Gel Permeation Chromatography (GPC)) of at least 50,000, preferably at least 100,000, more preferably at least 200,000 g/mol, and alternately less than 300,000, preferably less than 250,000, most preferably less than 200,000 g/mol. Unless otherwise indicated, Mw, Mn, and MWD are determined by GPC as described in US 2006/0173123 page 24-25, paragraphs [0334] to [0341].

In a preferred embodiment, Component A has a unimodal or multimodal molecular weight distribution as determined by GPC. By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

In a preferred embodiment, Component A is characterized as having low amorphous polypropylene content, preferably less than 3% by weight (based upon the weight of Component A), more preferably less than 2% by weight, even more preferably less than 1% by weight and most preferably there is no measurable amorphous polypropylene.

Component B

Component B preferably comprises 70 wt % to 97 wt % ethylene derived units and 3 wt % to 30 wt % $C_3$ to $C_{20}$ alpha olefin derived units, based on the weight of Component B. Component B is most preferably a copolymer consisting essentially of ethylene and propylene, although other ethylene copolymers or terpolymers may be suitable depending on the particular product properties desired. For example, ethylene/butene, ethylene/hexene, or ethylene/octene copolymers, and ethylene/propylene/hexene-1 terpolymers may be used. In a preferred embodiment, Component B is a copolymer comprising 70 wt % to 97 wt % ethylene derived units, more preferably from about 80 wt % to 97 wt % ethylene derived units, even more preferably from about 80 wt % to 95 wt % ethylene derived units. The comonomer content of Component B is preferably in the range of from about 3% to about 30% by weight comonomer, more preferably from about 5% to about 30% by weight comonomer, even more preferably from about 5% to about 20% by weight comonomer. Preferred comonomers are propylene, butene, pentene, hexene, octane, and decene. Preferably, Component B is selected from the group consisting of: ethylene-propylene, ethylene-butene, ethylene-hexene, ethylene-octene, and ethylene-decene copolymers (preferably Component B is a terpolymer selected from the group consisting of: ethylene-butene-propylene, ethylene-hexene-propylene, ethylene-octene-propylene, and ethylene-decene-propylene). Most preferably, Component B consists essentially of ethylene and from about 3% to about 30% by weight propylene, more preferably from about 5% to about 30% by weight propylene, even more preferably from about 5% to about 20% by weight propylene.

For other Component B copolymers, the comonomer contents may need to be adjusted depending on the specific properties desired. For example, for ethylene-hexene copolymers, Component B may contain at least 17% by weight hexene and at least 83% by weight ethylene.

Component B preferably has a narrow MWD, preferably 3.5 or less, preferably 3.0 or less, more preferably 2.5 or less, and most preferably 2.25 or less. These molecular weight distributions should be obtained in the absence of visbreaking or peroxide or other post reactor treatment designed to reduce molecular weight. Component B preferably has a weight average molecular weight (Mw as determined by GPC) of at least 50,000, preferably at least 150,000, and most preferably at least 200,000 g/mol, or alternately less than 1,000,000, less than 650,000, less than 500,000, or less than 300,000 g/mol.

Component B preferably has high crystallinity, preferably greater than 60% by weight of a crystalline portion, more preferably greater than 85% by weight of a crystalline portion.

Properties of in-Reactor Compositions

The in-reactor compositions of this invention have a multimodal melting point. The term "multimodal," when used to describe the melting point of a polymer or polymer composition is understood to mean that the Differential Scanning calorimetry (DSC) trace, plotted as heat flow (J/g) versus temperature (° C.), has more than one peak or inflection point. An "inflection point" is that point where the second derivative of the curve changes in sign (e.g., from negative to positive or vice versa). For example, an in-reactor composition that has two melting points (first melt) of 126.61° C. and 160.29° C. is considered to have a "bimodal" melting point.

The in-reactor compositions preferably have a multimodal melting point (preferably two melting points or more, preferably three melting points or more, most preferably two melting points). Preferably, at least one melting point is 153° C. or greater, preferably 155° C. or greater, preferably 157° C. or greater, preferably 160° C. or greater, and preferably 162° C. or greater, alternately 180° C. or less, 175° C. or less, 170° C. or less, 165° C. or less. Preferably, at least one other melting point is 110° C. or greater, preferably 120° C. or greater, preferably 130° C. or greater, preferably 140° C. or greater, alternately 145° C. or less, 130° C. or less, or 125° C. or less. In a preferred embodiment, two of the melting points differ by at least 10° C., preferably by at least 20° C., preferably by at least 25° C., preferably by at least 30° C., preferably by at least 35° C., preferably by at least 40° C. In another embodiment, two of the melting points differ by 10° C. to 70° C., preferably by 15° C. to 60° C., preferably 20° C. to 50° C.

Melting points ($T_m$) are measured using Differential Scanning calorimetry (DSC), according to the following method. Approximately 0.05 g of each sample is weighed into a tared aluminum pan. The pan is sealed with a hermetic lid. The DSC pans are then annealed in an oven purged with nitrogen at 220° C. (first melt) for 15 minutes, and allowed to cool overnight to room temperature (23° C. throughout this specification unless otherwise stated). The DSC pans are loaded into the TA Instruments Q200 DSC at room temperature. The sample is equilibrated at 25° C., then heated at a heating rate 10° C./min to 200° C. The sample is held at a temperature of 200° C. for one minute, and then cooled at a rate of 5° C./min to a temperature of −90° C. The sample is held at a temperature of −90° C. for one minute, and then heated at a rate of 10° C./min to a temperature of 220° C. The endothermic melting transition, if present, is analyzed for onset of transition and peak temperature. The melting temperatures reported are the peak melting temperatures from the first heat unless otherwise specified.

The in-reactor compositions of this invention also have a multimodal heat of fusion, each heat of fusion corresponding to a melting point. Preferably, at least one heat of fusion is 2 J/g or greater, preferably 5 J/g or greater, preferably 10 J/g or greater, preferably 15 J/g or greater, and preferably 20 J/g or greater; alternately 30 J/g or less, 25 J/g or less, 20 J/g or less, or 15 J/g or less. Preferably, at least one other melting point is 30 J/g or greater, preferably 50 J/g or greater, preferably 75 J/g or greater, preferably 90 J/g or greater, alternately 80 J/g or less, 60 J/g or less, or 40 J/g or less. In a preferred embodiment, two of the heats of fusion differ by at least 10 J/g, preferably by at least 20 J/g, preferably by at least 25 J/g, preferably by at least 30 J/g, preferably by at least 35 J/g, preferably by at least 40 J/g. In another embodiment two of the heats of fusion differ by 10 to 70 J/g, preferably by 15 to 60 J/g, preferably 20 to 50 J/g.

The in-reactor compositions of this invention are in the form of free-flowing, discrete particles. Preferably, the free-flowing discrete particles of the in-reactor compositions of the present invention may be regarded as a pourable free-flowing polymer. As such, the particles of the present invention are not tacky or sticky, and thus do not block, which is to say the particles do not stick to one another nor to other surfaces so as to form agglomerates comprising a plurality of pellets to an extent which prevents the pellets from being pourable.

By "pourable free-flowing" it is meant that the particles will flow through a funnel and yield a pourability value according to ASTM D1895 Method B modified to use a funnel having a 29 mm bottom opening, preferably both initially and after elevated temperature storage (e.g., storage at 120° F. for 7 days). Accordingly, the particles of the present invention are pourable free-flowing in that they may be poured through a funnel having a 2.9 cm opening at the narrow end.

An initial pourability value (i.e., prior to aging or storage) of the particles of the present invention is about 120 seconds or less, when determined according to ASTM D1895 Method B modified to use a funnel having a 29 mm bottom opening. Preferably, the pourability value is about 60 seconds or less, more preferably about 30 seconds or less, still more preferably about 10 seconds or less, more preferably about 5 seconds or less, still more preferably about 2 seconds or less, when determined according to ASTM D1895 Method B modified to use a funnel having a 29 mm bottom opening. Accordingly, the polymer of the present invention is preferably pelletized into a plurality of pourable free flowing particles that may be poured through a funnel having a 29 mm bottom opening. In a preferred embodiment, the plurality of pourable free flowing particles of the polymer (whether pellet or neat particle directly from the reactor) can be poured through a funnel having a 29 mm bottom opening in 120 seconds or less, preferably in 60 seconds or less, more preferably in 30 seconds or less, more preferably in 20 seconds or less. In a particularly preferred embodiment, after storage at 120° C. for 7 days, the plurality of pourable free flowing particles of the polymer (whether pellet or neat particle directly from the reactor) can be poured through a funnel having a 29 mm bottom opening in 120 seconds or less, preferably in 60 seconds or less, more preferably in 30 seconds or less, more preferably in 20 seconds or less.

Properties of these propylene-based in-reactor compositions may include a melt flow rate of at 230° C. and 2.16 kg load in the range of from about 0.85 to about 50 g/10 min; and/or a tensile strength at yield in the range of from 2000 to about 5000 psi; and/or a 1% secant flexural modulus at a crosshead speed of 50.8 mm/min in the range of from about 150 to about 250 kpsi.

The propylene-based in-reactor composition preferably has a melt flow rate ("MFR") at 230° C. and 2.16 kg load in the range of from about 0.85 to about 50 g/10 min (preferably from about 1.0 to about 45 g/10 min, preferably from about 2 to about 40 g/10 min, or preferably from about 5 to about 35 g/10 min. MFR is measured as per ASTM D1238, condition L, at 230° C. and 2.16 kg load using a melt indexer.

The propylene-based in-reactor composition preferably has a tensile strength at yield in the range of from 2000 to about 5000 psi (preferably from about 2500 to about 5000 psi, preferably 2750 to 4500 psi, preferably from about 3000 to about 4500 psi). Tensile strength at yield is measured as per ASTM D638, with a crosshead speed of 50.8 mm/min (2.0 in/min), and a gauge length of 50.8 mm (2.0 in), using an INSTRON™ machine.

The propylene-based in-reactor composition preferably has a 1% secant flexural modulus at a crosshead speed of 50.8 mm/min in the range of from about 150 to about 250 kpsi (preferably from about 175 to about 250 kpsi, preferably from 175 to about 225 kpsi, preferably from about 200 to about 225 kpsi). The flexural modulus was measured according to ASTM D790A, using a crosshead speed of 1.27 mm/min (0.05 in/min), and a support span of 50.8 mm (2.0 in) using an INSTRON™ machine.

The propylene-based in-reactor composition preferably has a notched izod impact strength at 21° C. in the range of from about 0.5 to 8 ft·lbs/in (preferably from about 0.5 to about 7.0 ft·lbs/in, preferably from about 1.0 to about 6.5 ft·lbs/in, preferably from about 2.0 to about 6.0 ft·lbs/in). The Notched Izod impact strength was measured as per ASTM D256 at room temperature (21° C.), using equipment made by Empire Technologies Inc.

The propylene-based in-reactor composition preferably has an elongation at break of greater than 100%, preferably greater than 150%, preferably greater than 200%, preferably greater than 250% preferably greater than 300%, preferably greater than 350% preferably greater than 400%. The elongation at break was measured as per ASTM D 638.

The propylene-based in-reactor composition preferably has a Heat Deflection Temperature (HDT) of 90° C. or more, preferably 95° C. or more, preferably 100° C. or more as measured by ASTM D 648 (66 psi).

The in-reactor compositions of this invention are "reactor produced" meaning Components A and B are not physically or mechanically blended together. Rather, they are interpolymerized in at least one reactor, as described below. The final in-reactor compositions as obtained from the reactor or reactors, however, can be blended with various other components including other polymers. A variety of additives may be incorporated into the ICP for various purposes. Such additives include, for example, stabilizers, antioxidants, fillers, colorants, nucleating agents and mold release agents.

Processes to Produce Propylene-Based in-Reactor Compositions

This invention relates to a process for producing propylene-based in-reactor compositions comprising: (a) contacting propylene and from about 0 wt % to 10 wt % $C_2$ and/or $C_4$ to $C_{20}$ alpha olefins under polymerization conditions in a first stage to form Component A; (b) contacting Component A, ethylene and from about 3 wt % to 30 wt % of one or more $C_3$ to $C_{20}$ alpha olefin, in the presence of a metallocene catalyst system, under polymerization conditions in a second stage to form Component B; wherein the metallocene catalyst system comprises: (i) a metallocene compound comprising a group 4, 5, or 6 metal, (ii) an activator, and (iii) a support material; and (c) obtaining a propylene-based in-reactor composition comprising Component A and Component B, wherein the propylene-based in-reactor composition has a multimodal melting point, optionally, an elongation at break of greater than 100%.

The in-reactor compositions of this invention may be prepared by conventional polymerization processes such as a two-step process, although it is also possible to produce these in-reactor compositions in a single reactor. Each stage may be independently carried out in either the gas, solution or liquid slurry phase. For example, the first stage may be conducted in the gas phase and the second in liquid slurry or vice versa. Alternatively, each phase may be the same. Preferably, the in-reactor compositions of this invention are produced in multiple reactors, preferably two or three, operated in series, Component A is preferably polymerized first, in a gas phase, liquid slurry or solution polymerization process. Component B is preferably polymerized in a second, gas phase reactor. In an alternative embodiment, Component A is made in at least two reactors in order to obtain fractions with varying melt flow rate. This is thought to improve the processability of the in-reactor composition.

As used herein "stage" is defined as that portion of a polymerization process during which one component of the in-reactor composition, Component A or Component B, is produced. One or multiple reactors may be used during each stage.

The stages of the polymerization processes of this invention can be carried out in any manner known in the art, in solution, in suspension or in the gas phase, continuously or batchwise, or any combination thereof, in one or more steps. Homogeneous polymerization processes are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles, and at least 95 wt % of polymer products derived from the supported catalyst are in granular form as solid particles (not dissolved in the diluent). Gas phase processes are particularly preferred.

If the polymerization is carried out as a suspension or solution polymerization, an inert solvent may be used, for example, the polymerization may be carried out in suitable diluents/solvents. Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents. It is also possible to use mineral spirit or a hydrogenated diesel oil fraction as a solvent. Toluene may also be used. The polymerization is preferably carried out in the liquid monomer(s). If inert solvents are used, the monomer(s) is (are) metered in gas or liquid form.

In a preferred embodiment, the feed concentration of the monomers and comonomers for the polymerization is 60 vol % solvent or less, preferably 40 vol % or less, or preferably 20 vol % or less, based on the total volume of the feedstream. Preferably, the polymerization is run in a bulk process.

Preferred polymerizations can be run at any temperature and/or pressure suitable to obtain the desired polymers. Typical temperatures and/or pressures include a temperature greater than 30° C., preferably greater than 50° C., preferably greater than 65° C., alternately less than 200° C., preferably less than 150° C., most preferred less than 140° C.; and at a pressure in the range of from about 0.35 MPa to about 10 MPa, preferably from about 0.45 MPa to about 6 MPa, or preferably from about 0.5 MPa to about 4 MPa.

In a typical polymerization, the run time of the reaction is up to 300 minutes, preferably in the range of from about 5 to 250 minutes, or preferably from about 10 to 120 minutes.

Hydrogen may be added to one or both reactors to control molecular weight and MFR. The use of hydrogen for such purposes is well known to those skilled in the art. The overall pressure in the polymerization system usually is at least about 0.5 bar, preferably at least about 2 bar, most preferred at least about 5 bar. Pressures higher than about 100 bar, e.g., higher than about 80 bar and, in particular, higher than about 64 bar are usually not preferred. In some embodiments, hydrogen is present in the polymerization reactor at a partial pressure of from 0.001 to 100 psig (0.007 to 690 kPa), preferably from 0.001 to 50 psig (0.007 to 345 kPa), preferably from 0.01 to 25 psig (0.07 to 172 kPa), more preferably 0.1 to 10 psig (0.7 to 70 kPa).

Monomers

In the first stage, propylene and from about 0 wt % to 10 wt % $C_2$ and/or $C_4$ to $C_{20}$ alpha olefins are contacted under polymerization conditions to form Component A. In the first stage, the monomers comprise propylene and optional comonomers comprising one or more ethylene and/or $C_4$ to $C_{20}$ olefins, preferably $C_4$ to $C_{16}$ olefins, or preferably $C_6$ to $C_{12}$ olefins. The $C_4$ to $C_{20}$ olefin monomers may be linear, branched, or cyclic. The $C_4$ to $C_{20}$ cyclic olefins may be strained or unstrained, monocyclic or polycyclic, and may optionally include heteroatoms and/or one or more functional groups.

In the second stage, Component A, ethylene and from about 3 wt % to 30 wt % of one or more $C_3$ to $C_{20}$ alpha olefin are contacted in the presence of a metallocene catalyst system, under polymerization conditions to form Component B. In the second stage, the monomers comprise ethylene and optional comonomers comprising one or more $C_3$ to $C_{20}$ olefins, preferably $C_4$ to $C_{16}$ olefins, or preferably $C_6$ to $C_{12}$ olefins. The $C_3$ to $C_{20}$ olefin monomers may be linear, branched, or cyclic. The $C_3$ to $C_{20}$ cyclic olefins may be strained or unstrained, monocyclic or polycyclic, and may optionally include heteroatoms and/or one or more functional groups.

Examples of $C_2$ to $C_{20}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene. Preferably, the polymerization or copolymerization is carried out using olefins such as ethylene, propylene, 1-butene, 1-hexene, 4-methyl-1-pentene, and 1-octene, vinylcyclohexane, norbornene and norbornadiene. In particular, propylene and ethylene are polymerized.

In some embodiments, where butene is the comonomer, the butene source may be a mixed butene stream comprising various isomers of butene. The 1-butene monomers are expected to be preferentially consumed by the polymerization process. Use of such mixed butene streams will provide an economic benefit, as these mixed streams are often waste streams from refining processes, for example, $C_4$ raffinate streams, and can therefore be substantially less expensive than pure 1-butene.

In preferred embodiments, the monomers comprise 0 wt % diene monomer.

In an alternate embodiment, the productivity of the catalyst system is at least 50 gpolymer/g (cat)/hour, preferably 500 or more gpolymer/g (cat)/hour, preferably 5000 or more gpolymer/g (cat)/hour, preferably 50,000 or more gpolymer/g (cat)/hour.

In an alternate embodiment, the conversion of olefin monomer is at least 10%, based upon polymer yield and the weight of the monomer entering the reaction zone, preferably 20% or more, preferably 30% or more, preferably 50% or more, preferably 80% or more. A "reaction zone", also referred to as a "polymerization zone," is a vessel where the polymerization process takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In preferred embodiments, the polymerization occurs in two, three, four or more reaction zones.

Catalyst Systems

Ziegler-Natta Catalyst Systems

Component A may be produced using traditional Ziegler Natta catalyst systems 1) a solid titanium catalyst component comprising a titanium compound, a magnesium compound, and an internal electron donor; 2) a co-catalyst such as an organoaluminum compound, and 3) external electron donor(s). Ziegler-Natta catalysts, catalyst systems, and preparations thereof useful in the practice of the present invention include supported catalyst systems described in U.S. Pat. Nos. 4,990,479; 5,159,021; and PCT Publication No. WO 00/44795, preferably including solid titanium and/or magnesium. For example, useful Ziegler-Natta catalysts are typically composed of a transition metal compound from groups 4, 5, 6, and/or 7 (preferably group 4) and an organometallic compound of a metal from groups 11, 12, and/or 13 (preferably group 13) of the periodic table. Well-known examples include $TiCl_3$-$Et_2AlCl$, $AlR_3$—$TiCl_4$ wherein Et is an ethyl group and R represents an alkyl group, typically a $C_1$ to $C_{20}$ alkyl group, such as methyl, ethyl, propyl, butyl, pentyl, hexyl, octyl, and the like. These catalysts include mixtures of halides of transition metals, especially titanium, chromium, vanadium, and zirconium, with organic derivatives of nontransition metals, particularly alkyl aluminum compounds.

Briefly, the Ziegler-Natta catalysts can be obtained by: (1) suspending a dialkoxy magnesium compound in an aromatic hydrocarbon that is liquid at ambient temperatures; (2) contacting the dialkoxy magnesium-hydrocarbon composition with a titanium halide and with a diester of an aromatic dicarboxylic acid; and (3) contacting the resulting functionalized dialkoxy magnesiumhydrocarbon composition of step (2) with additional titanium halide.

The Ziegler-Natta catalyst is typically combined with a co-catalyst which is preferably an organoaluminum compound that is halogen free. Suitable halogen free organoaluminum compounds are, in particular, branched unsubstituted alkylaluminum compounds of the formula $AlR_3$, where R denotes an alkyl radical having 1 to 20 carbon atoms (preferably methyl, ethyl, propyl, butyl, pentyl, hexyl, octyl and the like), such as for example, trimethylaluminum, triethylaluminum, triisobutylaluminum, and tridiisobutylaluminum. Additional compounds that are suitable for use as a co-catalyst are readily available and amply disclosed in the prior art including U.S. Pat. No. 4,990,477, which is incorporated herein by reference. The same or different Ziegler-Natta catalyst(s) can be used in both the initial and subsequent polymerization steps. In a preferred embodiment, the solid catalyst is a magnesium supported $TiCl_4$ catalyst and the organoaluminum co-catalyst is triethylaluminum.

Electron donors are also typically used in two ways in the formation of Ziegler-Natta catalysts and catalyst systems. An internal electron donor may be used in the formation reaction of the catalyst as the transition metal halide is reacted with the metal hydride or metal alkyl. Examples of internal electron donors include amines, amides, ethers, esters, aromatic esters, ketones, nitriles, phosphines, stilbenes, arsines, phosphoramides, thioethers, thioesters, aldehydes, alcoholates, and salts of organic acids. In conjunction with an internal donor, an external electron donor may also used in combination with a catalyst. External electron donors often affect the level of stereoregularity in polymerization reactions.

The second use for an electron donor in a catalyst system is as an external electron donor and stereoregulator in the polymerization reaction. The same compound may be used in both instances, although typically they are different. Preferred external electron donor materials may include organic silicon compounds, e.g., tetraethoxysilane (TEOS) and dicyclopentyldimethoxysilane (DCPMS). Internal and external-type electron donors are described, for example, in U.S. Pat. No. 4,535,068, which is incorporated herein by reference. The use of organic silicon compounds as external electron donors are described, for example, in U.S. Pat. Nos. 4,218,339, 4,395,360, 4,328,122, 4,473, 660; 6,133,385; and 6,127,303, all of which are incorporated herein by reference. Particularly useful electron donors include external electron donors used as stereoregulators, in combination with Ziegler Natta catalysts.

A particularly useful Ziegler-Natta catalyst is a magnesium chloride supported titanium catalyst selected from the group of THC-C type catalyst solid systems available from Toho Titanium Corporation of Japan. Particularly preferred donor systems include those described in U.S. Pat. No. 6,087,459, such as for example, a blend of propyltriethoxysilane (PTES) and dicyclopentyldimethoxysilane (DCPMS), typically a 95/5 mole % blend. Another useful donor is methylcyclohexyl di-methoxysilane (MCMS).

A particular Ziegler-Natta catalyst may produce better results when paired with a particular group of electron donors. Examples of this paring of catalyst and electron donors are disclosed in U.S. Pat. Nos. 4,562,173 and 4,547,552, which are incorporated by reference herein.

Metallocene Catalyst Systems

A metallocene catalyst system is preferably used to produce at least Component B of the in-reactor compositions of this invention. Preferably, a metallocene catalyst system is also used to produce Component A of the in-reactor compositions of this invention. Most preferably, the same metallocene catalyst system is used to produce Components A and B of the in-reactor compositions of this invention.

The metallocene catalyst system used herein comprises: (i) a metallocene compound comprising a group 4, 5, or 6 metal; (ii) an activator (preferably an alumoxane or an ionic stoichiometric activator); and (iii) a support material. Each of these are discussed in turn, below.

(i) Metallocene Compounds

The metallocene catalyst system in the second stage preferably comprises a metallocene compound represented by one of the following formulae (I), (II), (III), or (IV).

In some embodiments of this invention, the metallocene compound is represented by the formula (I):

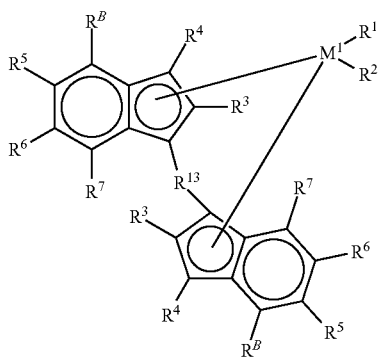

(I)

wherein:
$M^1$ is selected from titanium, zirconium, hafnium, vanadium, niobium, tantalum, chromium, molybdenum and tungsten (preferably $M^1$ is selected from titanium, zirconium, hafnium; preferably $M^1$ is zirconium);

$R^1$ and $R^2$ are selected from hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups and substituted or unsubstituted $C_7$ to $C_{40}$ arylalkenyl groups; optionally $R^1$ and $R^2$ are joined together to form a $C_4$ to $C_{40}$ alkanediyl group or a conjugated $C_4$ to $C_{40}$ diene ligand which is coordinated to $M^1$ in a metallacyclopentene fashion; optionally $R^1$ and $R^2$ represent a conjugated diene, optionally substituted with one or more groups independently selected from hydrocarbyl, trihydrocarbylsilyl and trihydrocarbylsilylhydrocarbyl groups, said diene having a total of up to 40 atoms not counting hydrogen and forming a π complex with $M^1$ (preferably $R^1$ and $R^2$ are selected from chlorine, $C_1$ to $C_6$ alkyl groups, $C_6$ to $C_{10}$ aryl groups, $C_7$ to $C_{12}$ arylalkyl groups and $C_7$ to $C_{12}$ alkylaryl groups; more preferably $R^1$ and $R^2$ are methyl groups);

each $R^3$ and $R^B$ is independently selected from hydrogen, halogen, substituted or unsubstituted $C_1$ to $C_{10}$ alkyl groups, substituted or unsubstituted $C_6$ to $C_{14}$ aryl groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups, substituted or unsubstituted $C_8$ to $C_{40}$ arylalkenyl groups, and —NR'$_2$, —SR', —OR', —SiR'$_3$, —OSiR'$_3$, and —PR'$_2$ radicals wherein each R' is independently selected from halogen, substituted or unsubstituted $C_1$ to $C_{10}$ alkyl groups and substituted or unsubstituted $C_6$ to $C_{14}$ aryl groups (preferably $R^3$ is selected from $C_3$ to $C_6$ alkyl groups and phenyl; more preferably $R^3$ is an isopropyl group);

$R^4$, $R^5$, $R^6$, and $R^7$ are each selected from the group consisting of hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups and $C_7$ to $C_{40}$ substituted or unsubstituted arylalkenyl groups (preferably $R^4$ is hydrogen or a $C_1$ to $C_{10}$ alkyl groups; preferably each of $R^5$, $R^6$, and $R^7$ are substituted or unsubstituted $C_1$ to $C_{10}$ alkyl groups, preferably ethyl, isopropyl, alkoxy, amido, carbazoles or indoles; preferably $R^4$, $R^5$, $R^6$, and $R^7$ are each hydrogen); and $R^{13}$ is selected from:

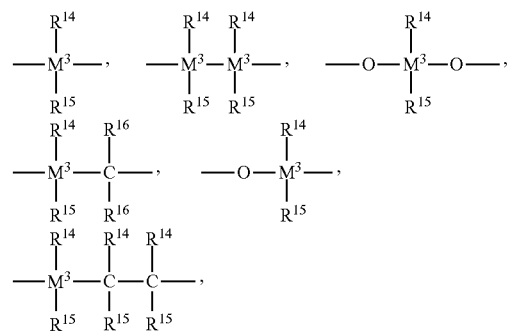

—B($R^{14}$)—, —Al($R^{14}$)—, —Ge—, —Sn—, —O—, —S—, —SO—, —SO$_2$—, —N($R^{14}$)—, —CO—, —P($R^{14}$)—, and —P(O)($R^{14}$)—;

wherein $R^{14}$, $R^{15}$, and $R^{16}$ are each independently selected from hydrogen, halogen, $C_1$ to $C_{20}$ alkyl groups, $C_6$ to $C_{30}$ aryl groups, $C_1$ to $C_{20}$ alkoxy groups, $C_2$ to $C_{20}$ alkenyl groups, $C_7$ to $C_{40}$ arylalkyl groups, $C_8$ to $C_{40}$ arylalkenyl groups, and $C_7$ to $C_{40}$ alkylaryl groups, optionally, $R^{14}$ and $R^{15}$, together with the atom(s) connecting them, form a ring; and $M^3$ is selected from carbon, silicon, germanium, and tin; or $R^{13}$ is represented by the formula:

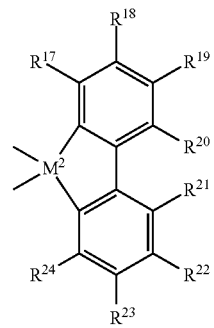

wherein $R^{17}$, $R^{18}$, $R^{19}$, $R^{20}$, $R^{21}$, $R^{22}$, $R^{23}$, and $R^{24}$ are each independently selected from hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ alkylaryl groups, substituted or unsubstituted $C_7$ to $C_{40}$ alkylaryl groups and substituted or unsubstituted $C_8$ to $C_{40}$ arylalkenyl groups; optionally two or more adjacent radicals $R^{17}$, $R^{18}$, $R^{19}$, $R^{20}$, $R^{21}$, $R^{22}$, $R^{23}$, and $R^{24}$, including $R^{20}$ and $R^{21}$, together with the atoms connecting them, form one or more rings; and $M^2$ represents one or more carbon atoms, or a silicon, germanium, or tin atom (preferably each $R^B$ is hydrogen, $R^{13}$ is $Si(CH_3)_2$, and $M^1$ is zirconium; alternately each $R^3$ is methyl, each $R^B$ is hydrogen, $R^{13}$ is $Si(CH_3)_2$, and $M^1$ is zirconium; alternately each RB is phenyl, each $R^3$ is methyl, $R^{13}$ is $Si(CH_3)_2$, and $M^1$ is zirconium).

In preferred embodiments, the metallocene compound is represented by the formula:

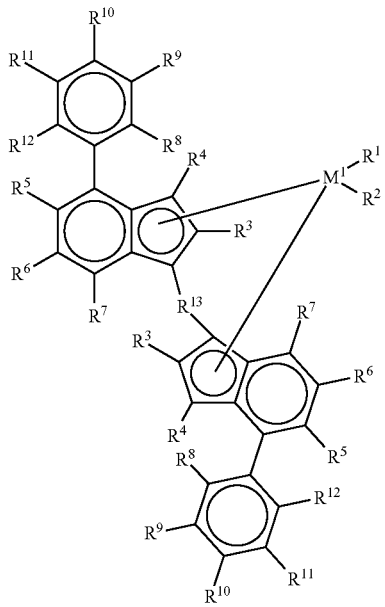

wherein:

$M^1$; $R^1$ and $R^2$; $R^3$; $R^4$, $R^5$, $R^6$, $R^7$, and $R^{13}$ are as defined above (preferably each $R^3$ is independently selected from isopropyl, isobutyl, sec-butyl, tert-butyl and phenyl groups, and each $R^{12}$ is independently selected from n-propyl, isopropyl, n-butyl, isobutyl, sec-butyl, tert-butyl, phenyl, tolyl, benzyl. and naphthyl groups);

$R^8$, $R^9$, $R^{10}$, and $R^{11}$ are each independently selected from hydrogen, halogen, substituted or unsubstituted $C_1$ to $C_{10}$ alkyl groups, substituted or unsubstituted $C_6$ to $C_{14}$ aryl groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups, substituted or unsubstituted $C_8$ to $C_{40}$ arylalkenyl groups, and —$NR'_2$, —$SR'$, —$OR'$, —$SiR'_3$, —$OSiR'_3$, and —$PR'_2$ radicals wherein each R' is as defined above; and $R^{12}$ is selected from halogen, substituted or unsubstituted $C_2$ to $C_{10}$ alkyl groups, substituted or unsubstituted $C_6$ to $C_{14}$ aryl groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups, substituted or unsubstituted $C_8$ to $C_{40}$ arylalkenyl groups, and —$NR'_2$, —$SR'$, —$OR'$, —$SiR'_3$, —$OSiR'_3$, and —$PR'_2$ radicals, wherein each R' is as defined above (preferably each $R^{12}$ is independently selected from substituted or unsubstituted $C_1$ to $C_6$ alkyl groups and substituted or unsubstituted $C_6$ to $C_{10}$ aryl groups; more preferably, at least one $R^{12}$ is phenyl). Such metallocene compounds are further described in U.S. Pat. No. 7,122,498, which is fully incorporated herein.

Preferably, the metallocene compound is represented by one or more of the formulae:

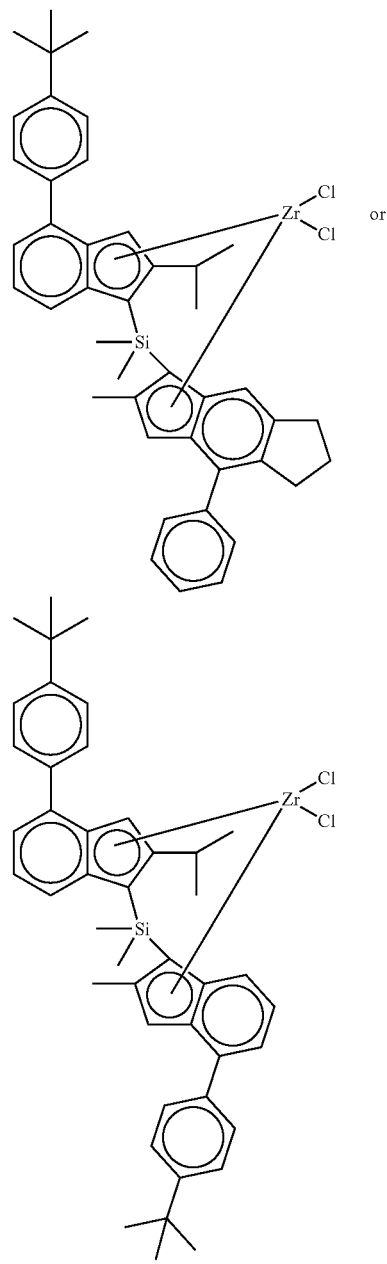

or the dimethyl analogs thereof

Such metallocene compounds are further described in U.S. Patent Application Ser. No. 61/720,555, entitled "Supported Metallocene Catalyst Systems and Methods of Preparation Thereof", filed on Oct. 31, 2012 and fully incorporated herein by reference.

In other embodiments of this invention, the metallocene compound is represented by the formula (II):

$$(Cp)_m R^4_n M^4 Q_k \qquad (II)$$

wherein each Cp is a cyclopentadienyl or a cyclopentadienyl substituted by one or more hydrocarbyl radical having from 1 to 20 carbon atoms (preferably alkyl, alkenyl, aryl, arylalkyl, or alkylaryl radicals having from one to 20 carbon atoms; preferably methyl, ethyl, propyl, isopropyl, butyl, butenyl, isobutyl, amyl, phenyl; preferably Cp is cyclopentadienyl and/or fluorenyl);

$R^A$ is a structural bridge between two Cp rings (preferably R is selected from the group consisting of dialkylsilicon groups having $C_1$ to $C_4$ alkyl substituents, which may be the same or different, and of alkadiyl radicals having 1 to 4 carbon atoms, preferably 2,2 propanediyl), alternately $R^A$ is as defined for $R^{13}$ above;

$M^4$ is a transition metal selected from groups 4 or 5 (preferably Ti, Zr, and Hf);

Q is a hydride or a hydrocarbyl group having from 1 to 20 carbon atoms or an alkenyl group having from 2 to 20 carbon atoms, or a halogen (preferably a halogen), alternately Q is as defined for $R^1$ above;

m is 1, 2, or 3, with the proviso that if m is 2 or 3, each Cp may be the same or different (preferably m=2);

n is 0 or 1, with the proviso that n=0 if m=1 (preferably n=1); and k is such that k+m is equal to the oxidation state of M, with the proviso that if k is greater than 1, each Q may be the same or different. One noted example is isoprenyl fluorenyl cyclopentadienyl zirconium dichloride. Such metallocene compounds are described in EP 0 426 646, which is fully incorporated herein by reference.

In yet other embodiments of this invention, the metallocene compound is represented by the formula (III):

$$R^A(CpR''_p)(CpR^*_q)M^5Q_r \qquad (III)$$

wherein:

each Cp is a cyclopentadienyl or substituted cyclopentadienyl ring;

each R* and R" is a hydrocarbyl group having from 1 to 20 carbon atoms and may be the same or different;

p is 0, 1, 2, 3, or 4;

q is 1, 2, 3, or 4;

$R^A$ is a structural bridge between the Cp rings imparting stereorigidity to the metallocene compound (preferably $R^A$ is selected from alkyl radicals having 1 to 4 carbon atoms or a hydrocarbyl radical comprising silicon, germanium, phosphorous, nitrogen, boron, or aluminum; preferably $R^A$ is silicon or an alkyl radical having 1 to 4 carbon atoms, alternately $R^A$ is as defined for $R^{13}$ above);

$M^5$ is a group 4, 5, or 6 metal (preferably titanium, zirconium, or hafnium);

Q is a hydrocarbyl radical having 1 to 20 carbon atoms or is a halogen, alternately Q is as defined for $R^1$ above;

r is s−2, where s is the valence of $M^5$; and wherein $(CpR^*_q)$ has bilateral or pseudobilateral symmetry; $R^*_q$ is selected such that $(CpR^*_q)$ forms a fluorenyl, alkyl substituted indenyl, or tetra-, tri-, or dialkyl substituted cyclopentadienyl radical; and $(CpR''_p)$ contains a bulky group in one and only one of the distal positions;

wherein the bulky group is of the formula $AR^W_v$;

where A is chosen from group 4 metals, oxygen, or nitrogen (preferably A is carbon or silicon, preferably carbon), and $R^W$ is a methyl radical or phenyl radical (preferably methyl), and v is the valence of A minus 1. "Bilateral symmetry" is defined as the condition in which there are no substituents or one or more substituents on one side and no substituents or one or more substituents on the other side, such that a mirror image is formed from one side to the other. One example of a bilaterally symmetrical metallocene useful herein is isopropyl(3-t--butyl cylopentadienyl-1-fluorenyl)zirconium dichloride, having the right side of the fluorenyl ligand being a mirror image of the left side. "Pseudobilateral symmetry" is defined as symmetry such that a mirror image exists from one side to the other in regard to the existence and position of substituents, but the substituents themselves are not identical. Such metallocene compounds are further described in U.S. Pat. No. 5,416,228, which is fully incorporated herein by reference.

In even other embodiments of this invention, the metallocene compound is represented by the formula (IV):

$$R^A(CpR''_p)(CpR^*_q)M^5Q_r \qquad (IV)$$

wherein:

each Cp is a cyclopentadienyl or substituted cyclopentadienyl ring;

each R* and R" is a hydrocarbyl group having from 1 to 20 carbon atoms and may be the same or different (preferably hydrocarbyl groups include methyl, ethyl, propyl, isopropyl, butyl, isobutyl, amyl, isoamyl, hexyyl, octyl, nonyl, decyl, cetyl, and phenyl), and may comprise hydrocarbyl radicals attached to a single carbon in the Cp ring, as well as radicals that are bonded to two carbon atoms in the ring;

p is 0, 1, 2, 3, or 4;

q is 1, 2, 3, or 4;

$R^A$ is a structural bridge between the Cp rings imparting stereorigidity to the metallocene compound (preferably $R^A$ is selected from alkyl radicals having 1 to 4 carbon atoms or a hydrocarbyl radical comprising silicon, germanium, phosphorous, nitrogen, boron, or aluminum, alternately $R^A$ is as defined for $R^{13}$ above);

$M^5$ is a group 4, 5, or 6 metal (preferably titanium, zirconium, or hafnium);

Q is a hydrocarbyl radical having 1 to 20 carbon atoms or is a halogen (preferably a halogen; preferably chlorine, alternately Q is as defined for $R^1$ above); and r is 0, 1, 2, or 3 (preferably 2); and wherein R*q is selected such that $(CpR^*_q)$ is a sterically different ring than $(CpR''_p)$. "Steric difference" or "sterically different ring" implies a difference between the steric characteristics of the Cp rings that controls the approach of each successive monomer that is added to the polymer chain. Such metallocene compounds are described in U.S. Pat. No. 4,892,851, which is fully incorporated herein by reference.

(ii) Activators

The activators useful herein include alumoxanes and ionic stoichiometric activators.

Alumoxanes

Preferred activators typically include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

In one embodiment, alumoxane activators are utilized as an activator in the catalyst system. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) co-catalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator at a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at 0 mol %, alternately the alumoxane is present at a molar ratio of aluminum to catalyst compound transition metal less than 500:1, preferably less than 300:1, preferably less than 100:1, preferably less than 1:1.

Ionic Stoichiometric Activators

A stoichiometric activator is a non-alumoxane compound, which may be neutral or ionic, which when combined in a reaction with the metallocene compound forms a catalytically active species at a molar ratio of stoichiometric activator to metallocene compound of 10:1 or less (preferably 5:1, more preferably 2:1, or even more preferably 1:1). It is within the scope of this invention to use a molar ratio of stoichiometric activator to metallocene compound of greater than 10:1, for example from 10:1 to 1000:1, alternately from 25:1 to 500:1, alternately from 50:1 to 500:1 alternately from 100:1 to 250:1. However, one of skill in the art would appreciate that the stoichiometric activator would be in excess, and that a catalytically active species may be obtained using a molar ratio of stoichiometric activator to metallocene compound of 10:1 or less.

The typical ionic stoichiometric (or non-alumoxane) activator-to-metallocene compound ratio is a 1:1 molar ratio. A particularly useful range is from 0.5:1 to 10:1, preferably 1:1 to 5:1. Alternate preferred ranges include from 0.1:1 to 100:1, alternately from 0.5:1 to 200:1, alternately from 1:1 to 500:1 alternately from 1:1 to 1000:1.

Ionic stoichiometric activators comprise a cation, which is preferably a Bronsted acid capable of donating a proton, and a compatible non-coordinating anion. Preferably, the anion is relatively large (bulky), capable of stabilizing the catalytically active species (preferably a group 4 catalytically active species) which is formed when the metallocene compound and the stoichiometric activator are combined. Preferably, the anion will be sufficiently labile to be displaced by olefinic, diolefinic, and acetylenically unsaturated substrates or other neutral Lewis bases, such as ethers, amines, and the like. Two classes of compatible non-coordinating anions have been disclosed in EP 0 277 003 A and EP 0 277,004 A: 1) anionic coordination complexes comprising a plurality of lipophilic radicals covalently coordinated to and shielding a central charge-bearing metal or metalloid core, and 2) anions comprising a plurality of boron atoms, such as carboranes, metallacarboranes, and boranes.

Ionic stoichiometric activators comprise an anion, preferably a non-coordinating anion. The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those that are compatible, stabilize the metallocene cation in the sense of balancing its ionic charge at +1, yet retain sufficient lability to permit displacement by an ethylenically or acetylenically unsaturated monomer during polymerization.

In a preferred embodiment of this invention, the ionic stoichiometric activators are represented by the following formula (1):

$$(Z)_d^+ A^{d-} \qquad (1)$$

wherein $(Z)_d^+$ is the cation component and $A^{d-}$ is the anion component; where Z is a reducible Lewis Acid; $A^{d-}$ is a non-coordinating anion having the charge d−; and d is 1, 2, or 3.

$(Z)_d^+$ is preferably represented by the formula: $(Ar)^{d+}$, where Ar is aryl or aryl substituted with a heteroatom, a $C_1$ to $C_{40}$ hydrocarbyl, or a substituted $C_1$ to $C_{40}$ hydrocarbyl. $(Z)_d^+$ is preferably represented by the formula: $(C_6H_yR'_z)^{d+}$, where y and z are each independently 0, 1, 2, 3, 4, or 5, provided that y+z is equal to 5, R' is a heteroatom, a $C_1$ to $C_{40}$ hydrocarbyl, or a substituted $C_1$ to $C_{40}$ hydrocarbyl. In preferred embodiments of this invention, $(Z)_d^+$ is represented by the formula: $(Ph_3C)^+$, where Ph is phenyl or phenyl substituted with a heteroatom, a $C_1$ to $C_{40}$ hydrocarbyl, or a substituted $C_1$ to $C_{40}$ hydrocarbyl. In a preferred embodiment, the reducible Lewis acid is triphenyl carbenium.

The anion component $A^{d-}$ includes those having the formula $[M^{k+}Q_n]^{d-}$ wherein k is 1, 2, or 3; n is 1, 2, 3, 4, 5, or 6, preferably 3, 4, 5, or 6; (n−k)=d; M is an element selected from group 13 of the Periodic Table of the Elements, preferably boron or aluminum; and each Q is, independently, a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide, and two Q groups may form a ring structure. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ components also include diboron compounds as disclosed in U.S. Pat. No. 5,447,895, which is fully incorporated herein by reference.

Illustrative examples of ionic stoichiometric activators useful in this invention include: triphenylcarbenium tetraphenylborate, triphenylcarbenium tetrakis(pentafluorophenyl) borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, and triphenylcarbenium tetrakis(3,5-bis (trifluoromethyl)phenyl)borate.

(iii) Support Material

In embodiments herein, the catalyst system comprises an inert support material. Preferably, the supported material is a porous support material, for example, talc, and inorganic oxides. Other support materials include zeolites, clays, organoclays, or any other organic or inorganic support material, and the like, or mixtures thereof Preferably, the support material is an inorganic oxide in a finely divided form. Suitable inorganic oxide materials for use in metallocene catalyst systems herein include Groups 2, 4, 13, and 14 metal oxides such as silica, alumina, and mixtures thereof. Other inorganic oxides that may be employed, either alone or in combination, with the silica or alumina are magnesia, titania, zirconia, and the like. Other suitable support materials, however, can be employed, for example, finely divided functionalized polyolefins such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 $m^2/g$ to about 700 $m^2/g$, pore volume in the range of from about 0.1 cc/g to about 4.0 cc/g, and average particle size in the range of from about 5 µm to about 500 µm. More preferably, the surface area of the support material is in the range of from about 50 $m^2/g$ to about 500 $m^2/g$, pore volume of from about 0.5 cc/g to about 3.5 cc/g, and average particle size of from about 10 µm to about 200 µm. Most preferably, the surface area of the support material is in the range of from about 100 $m^2/g$ to about 400 $m^2/g$, pore volume from about 0.8 cc/g to about 3.0 cc/g, and average particle size is from about 5 µm to about 100 µm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 $m^2/gm$, pore volume of 1.65 $cm^3/gm$), and is marketed under the tradenames of DAVISON 952 or DAVISON 955 by the Davison Chemical Division of W. R. Grace and Company. In other embodiments, DAVISON 948 is used.

In some embodiments of this invention, the process may further comprise calcining the support material at a temperature in the range of from about 100° C. to about 1000° C. prior to contacting with the alkyl aluminum compound in step (i). Drying of the support material can be achieved by heating or calcining at about 100° C. to about 1000° C., preferably at about 200° C. to 850° C., preferably at least about 600° C. (preferably the support material is calcined to a temperature of from about 550° C. to about 650° C.). When the support material is silica, it is typically heated to at least 200° C., preferably about 100° C. to about 1000° C., preferably about 200° C. to about 850° C., and most preferably at least about 600° C.; and for a time of about 1 minute to about 100 hours, from about 12 hours to about 72 hours, or from about 24 hours to about 60 hours.

In particular embodiments of this invention, the support material (preferably a calcined support material), is treated with an alkyl aluminum compound to provide an alkyl aluminum treated support material, wherein the alkyl aluminum compound is represented by the formula: $R_3Al$; wherein each R group is, independently, a substituted or unsubstituted $C_1$ to $C_{12}$ alkyl group, Cl or F with the provision that at least one R group is a $C_1$ to $C_{12}$ alkyl group.

Alkyl aluminum compounds which may be utilized include, for example, one or more of trimethyl aluminum, triethyl aluminum, tri-n-octyl aluminum, tri-isobutyl aluminum, tri-n-hexyl aluminum, and dimethyl aluminum fluoride. It is within the scope of this invention to use more than one alkyl aluminum compound to provide the alkyl aluminum treated support.

In some embodiments of this invention, the support material, typically having reactive surface groups, typically hydroxyl groups, is slurried in a non-polar solvent and the resulting slurry is contacted with a solution of an alkyl aluminum compound (for example, triethyl aluminum). The slurry mixture may be heated to about 0° C. to about 100° C., preferably to about 25° C. to about 85° C., preferably at room temperature. Room temperature is 23° C. unless otherwise noted. Contact times typically range from about 0.5 hours to about 24 hours, from about 2 hours to about 16 hours, or from about 4 hours to about 8 hours.

Suitable non-polar solvents are materials in which all of the reagents used herein, i.e., the alkyl aluminum compound, and the metallocene compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, alone or in combination, may also be employed.

In embodiments of the invention herein, the support material is contacted with a solution of an alkyl aluminum compound to form an alkyl aluminum treated support material. The period of time for contact between the alkyl aluminum and the support material is as long as is necessary to passivate the reactive groups on the support material. To "passivate" means to react with available reactive groups on the surface of the support material, thereby reducing the surface hydroxyl groups by at least 80%, at least 90%, at least 95%, or at least 98%. The surface reactive group concentration may be determined based on the calcining temperature and the type of support material used. The support material calcining temperature affects the number of surface reactive groups on the support material available to react with the metallocene compound and an alkyl aluminum compound: the higher the drying temperature, the lower the number of sites. For example, where the support material is silica which, prior to the use thereof in the first catalyst system synthesis step, is dehydrated by fluidizing it with nitrogen and heating at about 600° C. for about 16 hours, a surface hydroxyl group concentration of about 0.5 to about 0.9 millimoles per gram, preferably about 0.6 to about 0.9 millimoles per gram, preferably about 0.6 to about 0.8 millimoles per gram is typically achieved. Thus, the exact molar ratio of the alkyl aluminum compound to the surface reactive groups on the carrier will vary.

The amount of the alkyl aluminum compound which will be deposited onto the support material in the solution can be determined in any conventional manner, e.g., by adding the alkyl aluminum compound to the slurry of the carrier in the solvent, while stirring the slurry, until the alkyl aluminum compound is detected as a solution in the solvent by any technique known in the art, such as by $^1H$ NMR. For example, for the silica support material heated at about 600° C., the amount of the alkyl aluminum compound added to the slurry is such that the molar ratio of Al to the hydroxyl groups (OH) on the silica is about 0.5:1 to about 4:1, preferably about 0.8:1 to about 3:1, more preferably about 0.9:1 to about 2:1 and most preferably about 1:1. The amount of Al in/on the silica may be determined by using ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, eds., Butterworth-Heinemann, Boston, Mass., 1992, pp. 633-644. In another embodiment, it is also possible to add such an amount of the alkyl aluminum compound which is in excess of that which will be deposited onto the support material, and then remove, e.g., by filtration and washing.

Uses of Polyolefins

Polyolefins prepared using the processes described herein find uses in all applications including fibers, injection molded parts, films, pipes, and wire and cable applications. Examples include carpet fibers and primary and secondary carpet backing; slit tape applications such as tarpaulins, erosion abatement screens, sand bags, fertilizer and feed bags, swimming pool covers, intermediate bulk container (IBC) bags; nonwoven applications for spun-bonded, melt blown and thermobonded fibers; carded web applications such as disposable diaper liners, feminine hygiene products, tarpaulins and tent fabrics, and hospital garments; apparel applications such as socks, t-shirts, undergarments, bicycle shorts, sweat bands, football undershirts, hiking socks and other outdoor sporting apparel; cordage applications such as mooring and towing lines and rope; netting applications such as safety fences, geogrids for soil stabilization; injection molded applications such as appliance parts in automatic dishwashers and clothes washers, hand tools and kitchen appliances; consumer product applications such as outdoor furniture, luggage, infant car seats, ice coolers, yard equipment; medical applications such as disposable syringes and other hospital and laboratory devices; rigid packaging made by injection molding, blow molding or thermoforming such as margarine tubs, yogurt containers and closures, commercial bottles and ready-to-eat food containers; transportation applications such as automotive interior trim, instrument panels, bumper fascia, grills and external trim parts, battery cases; film applications such as snack packages and other food packaging and film labels, packing tapes and pressure sensitive labels; wire and cable applications such as wire insulation.

The polyolefins described herein may be used by themselves or blended with one or more additional polymers. In another embodiment, the polyolefin (preferably propylene or ethylene homopolymer or copolymer) produced herein is combined with one or more additional polymers prior to being formed into a film, molded part or other article. Useful additional polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE (low density polyethylene), LLDPE (linear low density polyethylene), HDPE (high density polyethylene), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM (ethylene-propylene-diene monomer rubber), block copolymer, styrenic block copolymers, polyamides, polycarbonates, PET (polyethylene terephthalate) resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the polyolefin (preferably propylene or ethylene homopolymer or copolymer) is present in the above blends, at from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The blends described above may be produced by mixing the polyolefins of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a BANBURY™ mixer, a HAAKE™ mixer, a BRABENDER™ internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

In particular embodiments, the polyolefins or blends thereof that may be used in film applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15, preferably 7 to 9. However, in another embodiment the film is oriented to the same extent in both the MD and TD directions.

The films may vary in thickness depending on the intended application; however, films of a thickness from 1 to 50 µm are usually suitable. Films intended for packaging are usually from 10 to 50 µm thick. The thickness of the sealing layer is typically 0.2 to 50 µm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

Molded Products

The polyolefins or blends thereof described herein may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

Further, the polyolefins or blends thereof may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. Typically, an extrudate film of the composition of this invention (and any other layers or materials) is placed on a shuttle rack to hold it during heating. The shuttle rack indexes into the oven which pre-heats the film before forming Once the film is heated, the shuttle rack indexes back to the forming tool. The film is then vacuumed onto the forming tool to hold it in place and the forming tool is closed. The tool stays closed to cool the film and the tool is then opened. The shaped laminate is then removed from the tool. The thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution.

Blow molding is another suitable forming means for use with the compositions of this invention, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

Likewise, molded articles may be fabricated by injecting molten polymer into a mold that shapes and solidifies the molten polymer into desirable geometry and thickness of molded articles. Sheets may be made either by extruding a substantially flat profile from a die, onto a chill roll, or alternatively by calendaring. Sheets are generally considered to have a thickness of from 10 mils to 100 mils (254 µm to 2540 µm), although any given sheet may be substantially thicker.

Non-Wovens and Fibers

The polyolefins or blends thereof described above may also be used to prepare nonwoven fabrics and fibers of this invention in any nonwoven fabric and fiber making process, including but not limited to, melt blowing, spunbonding, film aperturing, and staple fiber carding. A continuous filament process may also be used. Preferably, a spunbonding process is used. The spunbonding process is well known in the art. Generally it involves the extrusion of fibers through a spinneret. These fibers are then drawn using high velocity air and laid on an endless belt. A calender roll is generally then used to heat the web and bond the fibers to one another although other techniques may be used such as sonic bonding and adhesive bonding.

EXAMPLES

Anhydrous solvents were purchased from Sigma Aldrich (St. Louis, Mo.). All solvents were additionally dried over calcined alumina beads (calcined at 300° C. for 16 hours).

Comparative Impact Copolymer 1

The Comparative Impact Copolymer 1 was produced in a series of continuous commercial scale reactors as described below. A magnesium chloride supported titanium catalyst was selected from the group of THC-C type catalyst solid systems available from Toho Titanium Corporation of Japan. The donor system utilized in this example is described in U.S. Pat. No. 6,087,495, a blend of propyltriethoxysilane (PTES) and dicyclopentyldimethoxysilane (DCPMS). Catalyst composition preparation was carried out continuously in situ by contacting the catalyst solids, triethylaluminum, and the donor system to yield activated stereospecific catalyst for polymerization of propylene. The activated catalyst was continuously fed to a prepolymerization reactor where it continuously polymerized propylene to an activity of approximately 100 g-polymer/g-cat. The prepolymerized catalyst was then continuously fed to a series of two bulk slurry loop reactors, and polymerization continued under conditions to achieve a homopolymer with total activity of approximately 50 kg-polymer/g-cat. The reaction slurry (homopolymer granules in bulk propylene) was continuously separated from the liquid propylene. The active homopolymer granules were fed directly to a gas phase reactor where polymerization continued under conditions known in the art to produce ethylene-propylene polymer within the pores of the homopolymer "matrix" granules. The final product, referred to in the art as "impact copolymer" was continuously withdrawn from the gas phase reactor and separated from the unreacted monomer to produce a granular product for compounding and mechanical property testing.

Hydrogen concentration in the bulk loop reactors was used to control the molecular weight or melt flow rate (MFR) of the homopolymer, and the ethylene-propylene rubber molecular weight was controlled in the gas phase reactor by the hydrogen concentration level as well.

The granules from the reactor were stabilized with 0.15 wt % Irganox™ 101, 0.05 wt % Ultranox™ 626 A, and with 0.075 wt % sodium benzoate (fine form) and pelletized on twin screw extruder.

Inventive Examples 1-4

Synthesis of Metallocene Catalyst System 1

Metallocene 1, rac-dimethylsilanediyl(2-methyl-4-(4'-tert-butylphenyl)indenyl(2-isopropyl-4-(4'-tert-butylphenyl)indenyl)zirconium dimethyl was prepared as described in PCT Publication No. WO2005/058916.

Trimethylaluminum Treated Silica

In a 200 mL celstir flask, 16.3819 g of silica (DAVISON™ 948, calcined at 600° C. for 24 hours) was slurried into toluene and 0.727 g of AlMe$_3$ was added. The slurry was heated to 80° C. and allowed to stir. After 1 hour, the progress of the reaction was monitored by removing an aliquot of the toluene and checking for the presence of AlMe$_3$ via $^1$H NMR. No AlMe$_3$ was observed by $^1$H NMR, so an additional 0.20 g of AlMe$_3$ was added to the flask and the mixture was allowed to stir for another 15 min at 80° C. The progress of the reaction was checked again by $^1$H NMR. No AlMe$_3$ was observed by $^1$H NMR, so an additional 0.636 g of AlMe$_3$ was added to the flask. After 30 minutes, the reaction progress was once again checked, resulting in another addition of 1.14 g of AlMe$_3$. After 40 minutes, the methyl peaks of AlMe$_3$ were noted by $^1$H NMR, indicating completion of the reaction.

The slurry was then filtered and washed with toluene and allowed to dry overnight affording 17.1 g of a white solid.

Catalyst System 1

In a 20 mL vial, 36 mgs of triphenylmethyl tetrakis(perfluorophenyl)borate and 28 mgs of Metallocene 1 were combined together in 1.75 mL of toluene. The solution was allowed to stir for 35 minutes, during which it turned dark purple in color. Trimethylaluminum treated silica (1.000 g) was added to the vial and mixed together using a spatula until the silica was homogeneous in color. The solid was then dried under vacuum, producing 1.0 g of a pink/purple dry solid.

Polymerization

General Polymerization Process

Catalyst System 1 (0.930 gram) was slurried into dry HYDROBRITE™ oil to yield a slurry that contains 5% by weight of Catalyst System 1. An amount of the catalyst slurry was injected into a 2 L autoclave reactor containing propylene, $H_2$, and tri-n-octylaluminum, 1.0 mls of a 4.76 vol % hexane solution, at ambient temperature for 5 minutes, after which the reactor temperature was raised to the run temperature. After the run time had elapsed, the propylene was slowly vented while keeping the reactor temperature above 60° C. After venting the propylene to give a reactor pressure below 8 psi, isobutane was added in 200 ml portions until the reactor contained 1200 mls of isobutane. The reactor temperature was raised to the run temperature for the second stage and ethylene was added. The process conditions specific to Examples 1, 2, 3, and 4 are shown in Table 1, below.

TABLE 1

PROCESS CONDITIONS FOR POLYMERIZATIONS

|  | Inventive Example 1 | Inventive Example 2 | Inventive Example 3 | Inventive Example 4 |
|---|---|---|---|---|
| Catalyst System 1 (mg) | 0.046 | 0.046 | 0.046 | 0.046 |
| Catalyst Activity (g-polymer/g-cat) | 2130 | 5400 | 6300 | 5800 |
| Polymer produced (g) STAGE 1 | 494 | 365 | 287 | 260 |
| Propylene (mls) | 1250 | 1250 | 1250 | 1250 |
| Hydrogen pressure (psi) | 8 | 8 | 12 | 23 |
| Reactor Temperature (° C.) | 70 | 70 | 70 | 70 |
| Residence time (minutes) STAGE 2 | 50 | 45 | 40 | 40 |
| Ethylene pressure (psi) | 110 | 110 | 110 | 110 |
| Propylene pressure (psi) | 8 | 8 | 8 | 8 |
| Hydrogen pressure (psi) | 0 | 16 | 18 | 0 |
| Reactor Temperature (° C.) | 85 | 85 | 85 | 85 |
| Residence Time (minutes) | 180-330[a] | 120-170[b] | 120-170[b] | 120-170[b] |

[a] Run time varied from batch to batch depending on ethylene consumption with target ~90 grams PE 2$^{nd}$ stage
[b] Run time variation depending on ethylene consumption with target ~60 grams PE.

Characterization of Polymers

The metallocene produced propylene copolymers (from Inventive Examples 1-4 above) were characterized using the following techniques. A traditional propylene impact copolymer Comparative Impact Copolymer 1 (described above), produced using Zeigler-Natta catalyst systems, was also characterized for comparison.

GPC

Mn, Mw, and Mz were measured by using a Gel Permeation Chromatography (GPC) method using a High Temperature Size Exclusion Chromatograph (SEC, either from Waters Corporation or Polymer Laboratories), equipped with a differential refractive index detector (DRI). Experimental details, are described in: T. Sun, P. Brant, R. R. Chance, and W. W. Graessley, Macromolecules, Volume 34, Number 19, 6812-6820, (2001) and references therein. Three Polymer Laboratories PLgel 10 mm Mixed-B columns were used. The nominal flow rate was 0.5 $cm^3$/min, and the nominal injection volume was 300 μL. The various transfer lines, columns and differential refractometer (the DRI detector) were contained in an oven maintained at 135° C. Solvent for the SEC experiment was prepared by dissolving 6 grams of butylated hydroxy toluene as an antioxidant in 4 liters of Aldrich reagent grade 1,2,4 trichlorobenzene (TCB). The TCB mixture was then filtered through a 0.7 μm glass pre-filter and subsequently through a 0.1 μm Teflon filter. The TCB was then degassed with an online degasser before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/mL at room temperature and 1.324 g/mL at 135° C. The injection concentration was from 1.0 to 2.0 mg/mL, with lower concentrations being used for higher molecular weight samples. Prior to running each sample the DRI detector and the injector were purged. Flow rate in the apparatus was then increased to 0.5 mL/minute, and the DRI was allowed to stabilize for 8 to 9 hours before injecting the first sample. The concentration, c, at each point in the chromatogram was calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes of this invention and the claims thereto (dn/dc)=0.104 for propylene polymers and 0.1 otherwise. Units of parameters used throughout this description of the SEC method were: concentration was expressed in $g/cm^3$, molecular weight was expressed in g/mol, and intrinsic viscosity was expressed in dL/g.

The GPC results are shown in Table A, below.

TABLE A

GPC Characterization of Propylene Copolymers

|  | Comparative Impact Copolymer 1 | Inventive Example 2 |
|---|---|---|
| Mn (g/mol) | 45,730 | 59,178 |
| Mw (g/mol) | 183,000 | 178,836 |
| Mz (g/mol) | 541,000 | 332,622 |
| Mw/Mn | 4.0 | 3.02 |
| Mz/Mw | 2.95 | 1.86 |

NMR $^{13}$C NMR spectroscopy was used to measure the composition of the reactor products. Spectra were acquired using a 10 mm probe on a VARIAN™ spectrometer having a $^{13}$C frequency of at least 100 MHz. Sample preparation was performed at 140° C., where 0.25 grams of polymer was dissolved in deuterated solvent to give a final polymer solution volume of 3 mL. Chemical shifts were referenced by setting the most intense propylene methyl group signal to 21.83 ppm.

Chemical shift assignments for the homopolypropylene component may be found in the literature (L. Resconi, L. Cavallo, A. Fait, and F. Piemontesi, Chem. Rev. 2000, 100, pages 1253-1345) and the ethylene/ethylene propylene copolymer shift assignments were described by Randall in "A Review Of High Resolution Liquid $^{13}$Carbon Nuclear Magnetic Resonance Characterization of Ethylene-Based Polymers," Polymer Reviews, 29:2,201-317 (1989).

Samples made by sequentially polymerizing propylene and ethylene had the homopolypropylene component concentration calculated by summing intensities representing all propylene head-to-tail (H-T) additions to any intensity from propylene units that are part of polymer chain structures that result from the non-H-T addition of propylene. Specifically, intensity from the methylenes between adjacent H-T propylene (between 44 and 48 ppm) are added to the intensities from non-H-T units. The non-H-T units are represented by the intensities at 42.17, 43.21 and 27.55 ppm. To correctly account for the number of propylene units in these structures, the intensities at 42.17 and 43.21 ppm are multiplied by 3 and added to the 27.55 ppm signal intensity. Total homopolypropylene intensity is evaluated by summing the intensity of peaks between 44-48 ppm and at 27.55 ppm, to which is added 3 times sum of the intensity of the signals at 42.17 and 43.21 ppm.

Ethylene propylene copolymers and homopolypropylene may have signals which overlap when in the same sample. However, because this product is the result of sequentially polymerizing propylene and then introducing ethylene into the reactor after purging propylene from it, the presence of PPP and EPP+PPE triads are highly unlikely. In fact the $^{13}$C NMR spectrum does not show a resonance for the EPP triad at 30.85 ppm (the location of the CH in an EPP+PPE sequence). Without any EPP+PPE sequences in the polymer sample it is reasonable to assume that there are also no PPP sequences in the ethylene rich copolymer. Therefore, the propylene composition in the copolymer can be determined by measuring the amount of ethylene and propylene centered triads that are present. The ethylene copolymer content was determined from the intensities of the (E) centered triads (EEE+EEP+PEE+PEP) and the propylene level from the EPE intensity. Using the nomenclature of Randall the spectral intensities used to determine the individual triads amounts were EEE=$0.5*(\delta^+\delta^+ + 0.5*\gamma\delta^+)$; EEP+PEE=$\beta\delta^+$; PEP=$\beta\beta$; and EPE=EPE Methine. From these triad areas the propylene content in the ethylene rich copolymer may be calculated by dividing the EPE intensity by the total triad area.

Additionally, the fraction of ethylene rich copolymer in the reactor product is calculated by: 1−(42×(homopolypropylene intensity)/(14×(total intensity between 10 and 50 ppm)).

Assumptions used in calculations: Only copolymer was made after purging the reactor. There are no EPP PPP triad sequences in the copolymer, only EPE, EEE, EEP, and PEP.

The NMR characterization of the propylene copolymers is shown in Table 2, below.

TABLE 2

NMR CHARACTERIZATION OF PROPYLENE COPOLYMERS

| | Comparative Impact Copolymer 1 | Inventive Example 2 |
|---|---|---|
| PP homopolymer (wt %) | 81.5 | 81 |
| Regio misinsertion (2,1) (mol %) | — | 0.2 |
| Regio misinsertion (3,1) (mol %) | — | 0.1 |
| PE copolymer (wt %) | 18.5 | 19 |
| PE copolymer, propylene content (wt %) | 51 | 3.3 |
| Total ethylene in polymer (wt %) | 9.07 | 18.38 |

DSC

Melting points ($T_m$) were measured using Differential Scanning calorimetry (DSC), according to the following method. Approximately 0.05 g of each sample was weighed into a tared aluminum pan. The pan was sealed with a hermetic lid. The DSC pans were then annealed in an oven purged with nitrogen at 220° C. (first melt) for 15 minutes and allowed to cool overnight to room temperature. The DSC pans were loaded into the TA Instruments Q200 DSC at room temperature. The sample was equilibrated at 25° C., then heated at a heating rate 10 degree/min to 200° C. The sample was held at a temperature of 200° C. for one minute, and then cooled at a rate of 5° C./min to a temperature of −90° C. The sample was held at a temperature of −90° C. for one minute, and then heated at a rate of 10° C./min to a temperature of 220° C. The endothermic melting transition, if present, was analyzed for onset of transition and peak temperature. The melting temperatures reported were the peak melting temperatures from the first heat unless otherwise specified.

The DSC results for Inventive Example 1 are shown in FIG. 1. Desirably, the inventive propylene-based in-reactor composition have a first peak melting point within a range from 120 or 122° C. to 128 or 130 or 134° C., and a second peak melting point within a range from 156 or 158° C. to 164 or 166 or 170° C. Also desirably, the inventive propylene-based in-reactor composition have two peak crystallization temperatures, the first within a range from 110° C. to 118° C., and the second within a range from 118 or 120° C. to 124 or 126° C.

Sample Formulation and Pelletization

Samples

Metallocene catalyzed propylene copolymers (from Examples 1-4 above) and the Comparative Impact Copolymer 1 were formulated and blended and subjected to injection molding.

General Procedure

The reactor sample was formulated and blended with a primary antioxidant, IRGANOX™ 1010 (pentaerythritol tetrakis(3-(3,5-di-tert-butyl-4-hydroxyphenol) propionate)), at 0.015 wt %, a secondary antioxidant, ULTRANOX™ 626A (bis(2,4-di-tert-butyl phenyl)pentaerthrytol di-phosphate), at 0.05 wt % and with a sodium benzoate nucleating agent at 0.075 wt %.

The blended granule sample was pelletized using a 0.5 inch twin screw HAAKE™ extruder, using barrel temperatures in zones 1-3 as 410° F., 430° F., and 420° F., respectively. The die temperature was 400° F. and melt temperature was 380° F.

Injection Molding of Test Specimens

General Procedure

The pelletized sample was injection molded into ASTM test specimens using a 120 ton VAN DORN injection molding machine. The injection molding temperature was 450° F.

Test Methods

The following ASTM test methods are utilized for measurements of the physical properties of the propylene polymer compositions. The physical property measurements are shown in Table 3, below.

Melt Flow Rate (MFR)

MFR was measured as per ASTM D1238, condition L, at 230° C. and 2.16 kg load using a melt indexer.

Flexural Modulus

The flexural modulus was measured according to ASTM D790A, using a crosshead speed of 1.27 mm/min (0.05 in/min), and a support span of 50.8 mm (2.0 in) using an INSTRON machine.

Tensile Strength

The tensile strength at yield, elongation at yield and elongation at break were measured as per ASTM D638, with a crosshead speed of 50.8 mm/min (2.0 in/min), and a gauge length of 50.8 mm (2.0 in), using an INSTRON machine.

Notched Izod Impact Strength

The Notched Izod impact strength was measured as per ASTM D256 at room temperature (21° C.), using equipment made by Empire Technologies Inc.

Gardner Impact Strength

The low temperature Gardner impact strength on 3 inch (diameter)×0.125 inch (thickness) disks was measured at −29° C. as per ASTM D5420.

Heat Distortion Temperature

The heat distortion temperature was measured according to ASTM D 648 (66 psi).

TABLE 3

PHYSICAL PROPERTIES OF PROPYLENE POLYMERS

| | Comparative Impact Copolymer 1 | Inventive Example 1 | Inventive Example 2 | Inventive Example 3 | Inventive Example 4 |
|---|---|---|---|---|---|
| MFR (g/10 min) | 37 | 0.9 | 21.3 | 33 | 45.2 |
| Tensile Strength, psi (MPa) | 3847 (27) | 4297 (30) | 4707 (32) | 4500 (31) | 4189 (29) |
| Flexural Modulus-1% Secant, kpsi (MPa) | 214 (1470) | 186 (1280) | 206 (1420) | 193 (1330) | 205 (1410) |
| Notched IZOD Impact Strength, ft · lbs/in (J/m) | 1.22 (65) | 5.5 (290) | 0.8 (42) | 0.74 (39) | 0.72 (38) |
| Elongation at Break (%) | 41 | 493 | 673 | 480 | 17 |
| HDT at 66 psi (° C.) | 105 | 92 | 99 | 97 | 100 |

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise, "comprising" encompasses the terms "consisting essentially of," "is," and "consisting of" and anyplace "comprising" is used "consisting essentially of," "is," or "consisting of" may be substituted therefor.

What is claimed is:

1. A process for producing propylene-based in-reactor compositions comprising:
   (a) contacting propylene and from about 0 wt % to 10 wt % $C_2$ and/or $C_4$ to $C_{20}$ alpha olefins under polymerization conditions in a first stage to form Component A;
   (b) contacting Component A, ethylene, and from about 3 wt % to 30 wt % of one or more $C_3$ to $C_{20}$ alpha olefin, in the presence of a metallocene catalyst system, under polymerization conditions in a second stage, to form Component B, wherein the second stage is carried out in the gas phase;
   wherein the polymerizations are carried out in a reactor at a temperature of from about 50° C. to 140° C. where the reactor temperature is raised from the first to the second stage;
   wherein the metallocene catalyst system comprises:
   (i) a metallocene compound comprising a group 4, 5, or 6 metal;
   (ii) an ionic stoichiometric activator;
   (iii) a support material, wherein the support material is selected from the group consisting of silica, alumina, silica aluminates and clay having been first calcined followed by treatment with an alkyl aluminum compound; and
   (c) obtaining a propylene-based in-reactor composition comprising Component A and Component B; wherein the propylene-based in-reactor composition comprises from about 60 wt % to 90 wt % of Component A, based on the weight of the in-reactor composition; and
   wherein the propylene-based in-reactor composition produced therefrom has a multimodal melting point with at least one melting point of 157° C. or greater.

2. The process of claim 1, wherein Component A is produced by a metallocene catalyst system which may be the same as or different from the metallocene catalyst system of step (b), wherein the metallocene catalyst system comprises: (i) a metallocene compound comprising a group 4, 5, or 6 metal; (ii) an activator; and (iii) a support material.

3. The process of claim 2, wherein the metallocene catalyst system of step
   (a) is the same as the metallocene catalyst system of step (b).

4. The process of claim 2, wherein the process comprises 0 wt % diene monomer.

5. The process of claim 1, wherein the metallocene catalyst system comprises a metallocene compound represented by the following formula:

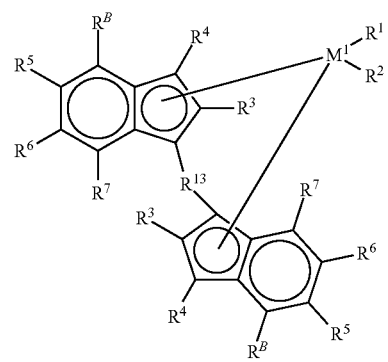

wherein:
M$^1$ is selected from titanium, zirconium, hafnium, vanadium, niobium, tantalum, chromium, molybdenum and tungsten;

R$^1$ and R$^2$ are selected from hydrogen, halogen, hydroxy, substituted or unsubstituted C$_1$ to C$_{10}$ alkyl groups, substituted or unsubstituted C$_1$ to C$_{10}$ alkoxy groups, substituted or unsubstituted C$_6$ to C$_{14}$ aryl groups, substituted or unsubstituted C$_6$ to C$_{14}$ aryloxy groups, substituted or unsubstituted C$_2$ to C$_{10}$ alkenyl groups, substituted or unsubstituted C$_7$ to C$_{40}$ arylalkyl groups, substituted or unsubstituted C$_7$ to C$_{40}$ alkylaryl groups and substituted or unsubstituted C$_7$ to C$_{40}$ arylalkenyl groups; optionally R$^1$ and R$^2$ are joined together to form a C$_4$ to C$_{40}$ alkanediyl group or a conjugated C$_4$ to C$_{40}$ diene ligand which is coordinated to M$^1$ in a metallacyclopentene fashion; optionally R$^1$ and R$^2$ represent a conjugated diene, optionally, substituted with one or more groups independently selected from hydrocarbyl, trihydrocarbylsilyl, and trihydrocarbylsilylhydrocarbyl groups, said diene having a total of up to 40 atoms not counting hydrogen and forming a πcomplex with M$^1$;

each R$^3$ and R$^B$ is independently selected from hydrogen, halogen, substituted or unsubstituted C$_1$ to C$_{10}$ alkyl groups, substituted or unsubstituted C$_6$ to C$_{14}$ aryl groups, substituted or unsubstituted C$_2$ to C$_{10}$ alkenyl groups, substituted or unsubstituted C$_7$ to C$_{40}$ arylalkyl groups, substituted or unsubstituted C$_7$ to C$_{40}$ alkylaryl groups, substituted or unsubstituted C$_8$ to C$_{40}$ arylalkenyl groups, and —NR'$_2$, —SR', —OR', —SiR'$_3$, —OSiR'$_3$, and —PR'$_2$ radicals wherein each R' is independently selected from halogen, substituted or unsubstituted C$_1$ to C$_{10}$ alkyl groups and substituted or unsubstituted C$_6$ to C$_{14}$ aryl groups;

R$^4$, R$^5$, R$^6$, and R$^7$ are each selected from the group consisting of hydrogen, halogen, hydroxy, substituted or unsubstituted C$_1$ to C$_{10}$ alkyl groups, substituted or unsubstituted C$_1$ to C$_{10}$ alkoxy groups, substituted or unsubstituted C$_6$ to C$_{14}$ aryl groups, substituted or unsubstituted C$_6$ to C$_{14}$ aryloxy groups, substituted or unsubstituted C$_2$ to C$_{10}$ alkenyl groups, substituted or unsubstituted C$_7$ to C$_{40}$ arylalkyl groups, substituted or unsubstituted C$_7$ to C$_{40}$ alkylaryl groups and C$_7$ to C$_{40}$ substituted or unsubstituted arylalkenyl groups; and R$^{13}$ is selected from:

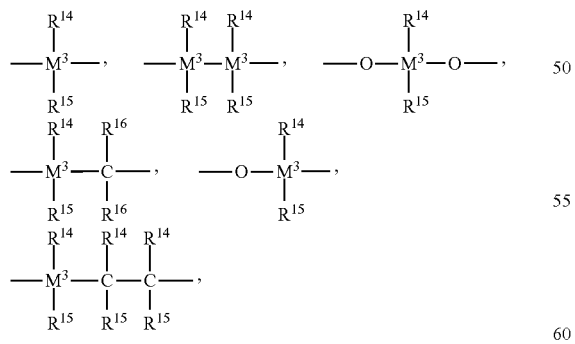

—B(R$^{14}$)—, —Al(R$^{14}$)—, —Ge—, —Sn—, —O—, —S—, —SO—, —SO$_2$—, N(R$^{14}$)—, —CO—, —P(R$^{14}$)—, and —P(0)(R$^{14}$)—;

wherein R$^{14}$, R$^{15}$, and R$^{16}$ are each independently selected from hydrogen, halogen, C$_1$ to C$_{20}$ alkyl groups, C$_6$ to C$_{30}$ aryl groups, C$_1$ to C$_{20}$ alkoxy groups, C$_2$ to C$_{20}$ alkenyl groups, C$_7$ to C$_{40}$ arylalkyl groups, C$_8$ to C$_{40}$ arylalkenyl groups and C$_7$ to C$_{40}$ alkylaryl groups, optionally R$^{14}$ and R$^{15}$, together with the atom(s) connecting them, form a ring; and M$^3$ is selected from carbon, silicon, germanium, and tin; or R$^{13}$ is represented by the formula:

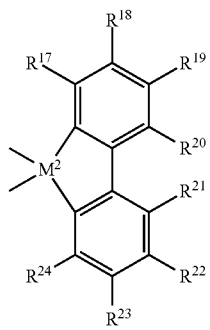

wherein R$^{17}$, R$^{18}$, R$^{19}$, R$^{20}$, R$^{21}$, R$^{22}$, R$^{23}$, and R$^{24}$ are each independently selected from hydrogen, halogen, hydroxy, substituted or unsubstituted C$_1$ to C$_{10}$ alkyl groups, substituted or unsubstituted C$_1$ to C$_{10}$ alkoxy groups, substituted or unsubstituted C$_6$ to C$_{14}$ aryl groups, substituted or unsubstituted C$_6$ to C$_{14}$ aryloxy groups, substituted or unsubstituted C$_2$ to C$_{10}$ alkenyl groups, substituted or unsubstituted C$_7$ to C$_{40}$ alkylaryl groups, substituted or unsubstituted C$_7$ to C$_{40}$ alkylaryl groups and substituted or unsubstituted C$_8$ to C$_{40}$ arylalkenyl groups; optionally two or more adjacent radicals R$^{17}$, R$^{18}$, R$^{19}$, R$^{20}$, R$^{21}$, R$^{22}$, R$^{23}$, and R$^{24}$, including R$^{20}$ and R$^{21}$, together with the atoms connecting them, form one or more rings; and M$^2$ represents one or more carbon atoms, or a silicon, germanium, or tin atom.

6. The process of claim 1, wherein the metallocene compound is represented by the following formula:

(CP)$_m$R$^4_n$M$^4$Q$_k$ wherein:
each Cp is a cyclopentadienyl or a cyclopentadienyl substituted by one or more hydrocarbyl radical having from 1 to 20 carbon atoms;
R$^A$ is a structural bridge between two Cp rings;
M$^4$ is a transition metal selected from groups 4 or 5;
Q is a hydride or a hydrocarbyl group having from 1 to 20 carbon atoms or an alkenyl group having from 2 to 20 carbon atoms, or a halogen;
m is 1, 2, or 3, with the proviso that if m is 2 or 3, each Cp may be the same or different;
n is 0 or 1, with the proviso that n=0 if m=1; and
k is such that k+m is equal to the oxidation state of M, with the proviso that if k is greater than 1, each Q may be the same or different.

7. The process of claim 1, wherein the metallocene compound is represented by the formula:

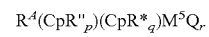

R$^A$(CpR"$_p$)(CpR*$_q$)M$^5$Q$_r$ wherein:
each Cp is a cyclopentadienyl or substituted cyclopentadienyl ring;
each R*and R" is a hydrocarbyl group having from 1 to 20 carbon atoms and may the same or different;
p is 0, 1, 2, 3, or 4;
q is 1, 2, 3, or 4;

$R^A$ is a structural bridge between the Cp rings imparting stereorigidity to the metallocene compound;

$M^5$ is a group 4, 5, or 6 metal;

Q is a hydrocarbyl radical having 1 to 20 carbon atoms or is a halogen;

r is s−2, where s is the valence of $M^5$;

wherein $(CpR^*_q)$ has bilateral or pseudobilateral symmetry; $R\cdot X_q$ is selected such that $(CpR\cdot X_q)$ forms a fluorenyl, alkyl substituted indenyl, or tetra-, tri-, or dialkyl substituted cyclopentadienyl radical; and $(CpR''_p)$ contains a bulky group in one and only one of the distal positions;

wherein the bulky group is of the formula $AR^{W}_v$; and where A is chosen from group 4 metals, oxygen, or nitrogen, and $R^w$ is a methyl radical or phenyl radical, and v is the valence of A minus 1.

8. The process of claim 1, wherein the metallocene compound is represented by the formula:

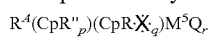

wherein:

each Cp is a cyclopentadienyl or substituted cyclopentadienyl ring;

each R·X and R" is a hydrocarbyl group having from 1 to 20 carbon atoms and may be the same or different;

p is 0, 1, 2, 3, or 4;

q is 1, 2, 3, or 4;

$R^A$ is a structural bridge between the Cp rings imparting stereorigidity to the metallocene compound;

$M^5$ is a group 4, 5, or 6 metal;

Q is a hydrocarbyl radical having 1 to 20 carbon atoms or is a halogen;

r is 0, 1, 2, or 3; and wherein R·X·q is selected such that $(CpR\cdot X_q)$ is a sterically different ring than $(CpR''_p)$.

9. The process of claim 1, wherein the ionic stoichiometric activator is selected from the group consisting of: triphenylcarbenium tetraphenylborate, triphenylcarbenium tetrakis (pentafluorophenyl)borate, triphenylcarbenium tetrakis -(2,3,4,6-tetrafluorophenyl) borate, triphenylcarbenium tetrakis(perfluoronaphthyl) borate, triphenylcarbenium tetrakis(perfluorobiphenyl)borate, and triphenylcarbenium tetrakis(3,5-bis(trifluoromethyl)phenyl)borate.

10. The process of claim 1, wherein the alkyl aluminum compound is one or more of trimethyl aluminum, triethyl aluminum, tri-n-octyl aluminum, tri-isobutyl aluminum, tri-n-hexyl aluminum, and dimethyl aluminum fluoride.

11. The process of claim 1, further comprising adding a co-catalyst, selected from the group consisting of: trimethylaluminum, triethylaluminum, triisobutylaluminum, tri-n-octylaluminum, trihexylaluminum, and diethylzinc, in step (a).

12. The process of claim 1, wherein the first stage is carried out in the gas phase.

13. The process of claim 1, wherein the polymerization conditions comprise a pressure of from about 140 psi to about 750 psi.

14. The process of claim 1, further comprising introducing Component A from step (a) into an intermediate stage, and depressurizing to less than 75 psi, before step (b).

15. The process of claim 1, wherein step (a) comprises 0 wt % $C_2$ and/or $C_4$ to $C_{20}$ alpha olefin, and Component A is a propylene homopolymer.

16. The process of claim 1, wherein Component B is selected from the group consisting of ethylene-propylene copolymer, ethylene-butene copolymer, ethylene-hexene, ethylene-octene, and ethylene-decene.

17. The process of claim 1, wherein Component B is a terpolymer selected from the group consisting of: ethylene-butene-propylene, ethylene-hexene-propylene, ethylene-octene-propylene, and ethylene-decene-propylene.

18. A propylene-based in-reactor composition comprising:

(a) from about 60 wt % to 90 wt % of a Component A polymer, based on the weight of the in-reactor composition; wherein Component A comprises 90 wt % to 100 wt % propylene derived units and 0 wt % to 10 wt % $C_2$ and/or $C_4$ to $C_{20}$ alpha olefin derived units, based on the weight of Component A;

(b) from about 10 wt % to 40 wt % of a Component B copolymer, based on the weight of the in-reactor composition; wherein Component B comprises 70 wt % to 97 wt % ethylene derived units and 3 wt % to 30 wt % $C_3$ to $C_{20}$ alpha olefin derived units, based on the weight of Component B;

wherein the total ethylene content of the propylene-based in-reactor composition ranges from 7.5 wt % to 48.5 wt %; and wherein the propylene-based in-reactor composition has a multimodal melting point with at least one melting point of 157° C. or greater, and an elongation at break of greater than 100%.

19. The propylene-based in-reactor composition of claim 18, wherein the propylene-based in-reactor composition has an elongation at break of greater than 200%.

20. The propylene-based in-reactor composition of claim 18, wherein the total ethylene content of the propylene-based in-reactor composition ranges from 15 wt % to 40 wt %.

* * * * *